United States Patent
Kadiwala et al.

(10) Patent No.: US 11,823,140 B2
(45) Date of Patent: Nov. 21, 2023

(54) SERVER AND METHOD FOR SENDING A TRANSACTION RECEIPT VIA A PUSH NOTIFICATION

(71) Applicant: MASTERCARD INTERNATIONAL INCORPORATED, Purchase, NY (US)

(72) Inventors: Asif Kadiwala, Vadodara (IN); PiyushKumar Mistry, Navsari (IN); Vinesh Gaadhe, Vadnagar-Kodinar (IN); Asheesh Agarwal, Ahmedabad (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1172 days.

(21) Appl. No.: 16/368,378

(22) Filed: Mar. 28, 2019

(65) Prior Publication Data

US 2019/0318325 A1 Oct. 17, 2019

(30) Foreign Application Priority Data

Apr. 17, 2018 (SG) .............................. 10201803203T

(51) Int. Cl.
*G06Q 20/04* (2012.01)
*G06Q 20/38* (2012.01)
(Continued)

(52) U.S. Cl.
CPC ........... *G06Q 20/047* (2020.05); *G06Q 20/30* (2013.01); *G06Q 20/38215* (2013.01); *H04L 67/55* (2022.05)

(58) Field of Classification Search
CPC .................. G06Q 20/047; G06Q 20/30; G06Q 20/38215; H04L 67/26
See application file for complete search history.

(56) References Cited

U.S. PATENT DOCUMENTS

2001/0029470 A1* 10/2001 Schultz ................. G06Q 30/02
  705/26.1
2004/0159700 A1* 8/2004 Khan .................. G06Q 20/327
  235/380

(Continued)

FOREIGN PATENT DOCUMENTS

KR 10-2017-0054648 5/2017
WO WO2016/157137 6/2016

OTHER PUBLICATIONS

A System and Method for Electronic Receipt Handling for Electronic Payments and Online Banking Systems, Oct. 18, 2012, The IP.com Prior Art Database, pp. 1-3 (Year: 2012).*

(Continued)

*Primary Examiner* — Nilesh B Khatri
(74) *Attorney, Agent, or Firm* — Harness, Dickey & Pierce, P.L.C.

(57) ABSTRACT

A server and method for sending a transaction receipt via a push notification is provided. The server comprises at least one processor; and at least one memory including computer program code; the at least one memory and the computer program code configured to, with the at least one processor, cause the server at least to: receive, from an issuer server, an approval message approving the user-initiated transaction request and transaction receipt details indicating a completion of the user-initiated transaction request, the user-initiated transaction request having corresponding transaction request details including a unique device identifier identifying a payment device that has been used to initiate the user-initiated transaction request; encrypt the transaction receipt details to provide encrypted transaction receipt details; and push, to the payment device identified by the unique device identifier, the encrypted transaction receipt details via a push notification channel.

12 Claims, 13 Drawing Sheets

(51) Int. Cl.
*G06Q 20/30* (2012.01)
*H04L 67/55* (2022.01)

(56) References Cited

U.S. PATENT DOCUMENTS

| | | | |
|---|---|---|---|
| 2005/0021480 A1* | 1/2005 | Haff | G07G 5/00 |
| | | | 705/75 |
| 2007/0011066 A1* | 1/2007 | Steeves | G06Q 20/3829 |
| | | | 705/35 |
| 2011/0276478 A1* | 11/2011 | Hirson | G06Q 20/16 |
| | | | 705/40 |
| 2013/0084896 A1* | 4/2013 | Barkie | H04W 12/033 |
| | | | 455/466 |
| 2013/0185214 A1 | 7/2013 | Azen et al. | |
| 2013/0275307 A1 | 10/2013 | Khan | |
| 2013/0346302 A1* | 12/2013 | Purves | G06Q 20/102 |
| | | | 705/40 |
| 2014/0025515 A1 | 1/2014 | Argue et al. | |
| 2014/0032343 A1 | 1/2014 | Argue et al. | |
| 2014/0032344 A1* | 1/2014 | Argue | G06Q 20/047 |
| | | | 705/17 |
| 2014/0358788 A1* | 12/2014 | Cummins | G06Q 20/047 |
| | | | 705/44 |
| 2015/0019435 A1 | 1/2015 | Ovick et al. | |
| 2015/0025986 A1* | 1/2015 | Patel | G06Q 20/384 |
| | | | 705/16 |
| 2015/0120418 A1* | 4/2015 | Cervenka | G06Q 20/20 |
| | | | 705/14.23 |
| 2015/0142514 A1* | 5/2015 | Tutte | G06Q 30/0202 |
| | | | 705/7.29 |
| 2016/0019539 A1* | 1/2016 | Hoyos | G06Q 20/3829 |
| | | | 705/75 |
| 2018/0150807 A1* | 5/2018 | Aaron | G06Q 20/04 |
| 2019/0215374 A1* | 7/2019 | Ragsdale | H04L 9/0891 |

OTHER PUBLICATIONS

Munir, A. 8 Examples of Super Transactional Push Notifications that Can Save Your Users' Day, Feb. 19, 2015 (12 pages) https://info.localytics.com/blog/8-examples-of-super-useful-push-messages-that-can-save-your-users-day-transactional-targeting-for-all-app-types.

* cited by examiner

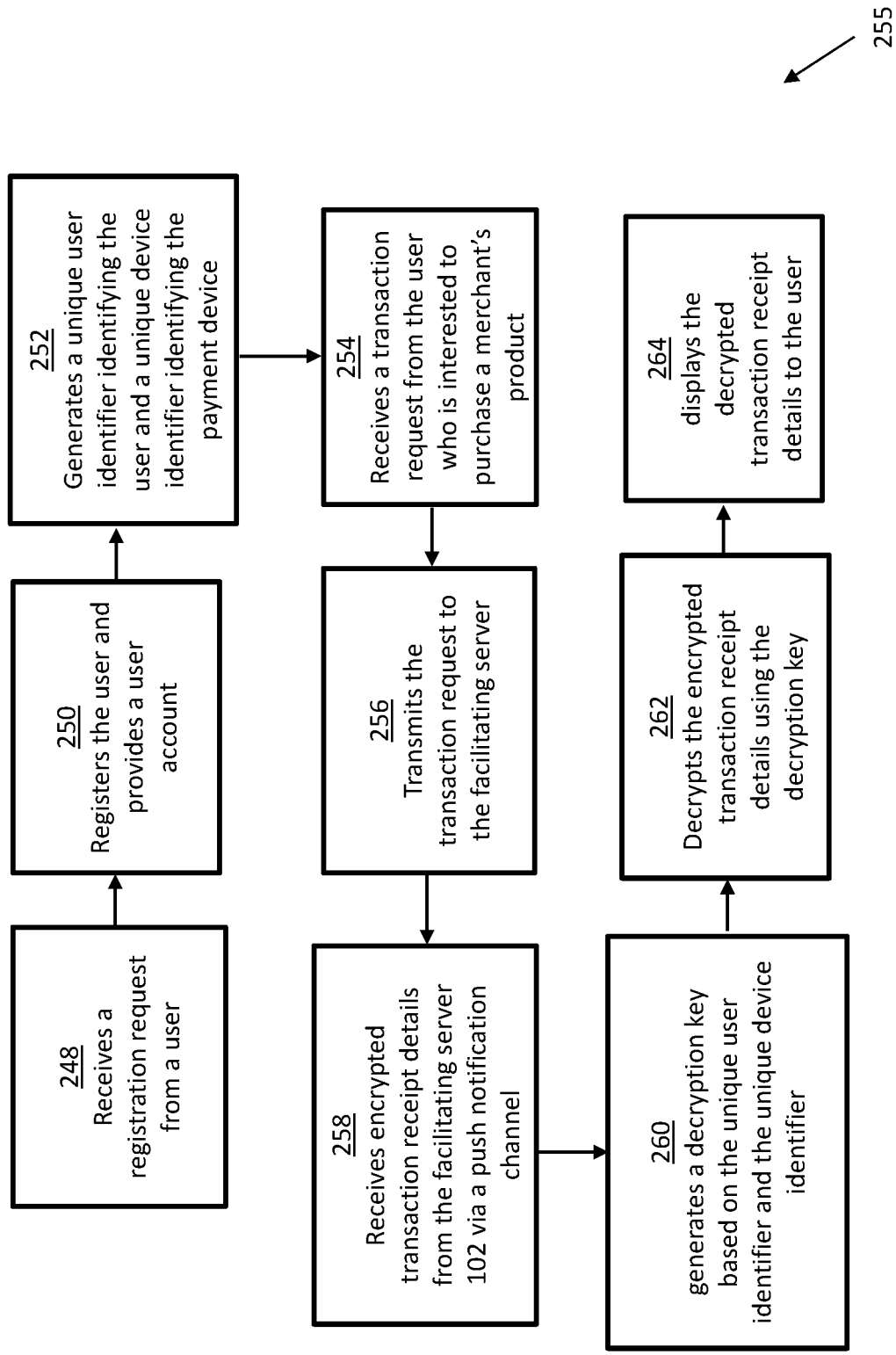

SERVER AND METHOD FOR SENDING A TRANSACTION RECEIPT VIA A PUSH NOTIFICATION

CROSS-REFERENCE TO RELATED APPLICATION

This application claims the benefit of, and priority to, Singapore Patent Application No. 10201803203T filed on Apr. 17, 2018. The entire disclosure of the above application is incorporated herein by reference.

FIELD

The present disclosure relates broadly, but not exclusively, to servers and methods for sending a transaction receipt via a push notification.

BACKGROUND

This section provides background information related to the present disclosure which is not necessarily prior art.

Mobile communication devices, such as mobile telephones, have been used by consumers to effect financial transactions. Such financial transactions include payment on a point-of-sale (POS) terminal at a merchant store using contactless methods or an online or remote transaction, e.g., using the Internet or via a mobile device application program.

During such transactions, a transaction receipt is presented to the consumer after a successful payment of the transaction by the consumer. Generally, the transaction receipt for a transaction is pulled by (or "requested by") the device used for making the payment. For example, in a typical contactless transaction, the device may be the POS terminal of the merchant such that the POS terminal pulls and prints the transaction receipt after the consumer has successfully paid for his purchase. In a remote transaction, the device may be a mobile phone of the consumer which pulls the transaction receipt after the successful payment of the transaction. A conventional pull model for a remote transaction is shown in FIG. 4c.

FIGS. 4a to 4c show schematic diagrams of typical systems that are being used currently in transactions. FIGS. 4a, 4b and 4c do not provide the encryption or decryption of the transaction receipt. In addition, conventional pull notifications, for example FIGS. 4a and 4b, contain multiple communication hops between different parties. FIG. 4a shows a schematic diagram 400 illustrating a conventional pull notification mechanism where there is no encryption or decryption of the transaction receipt. At step 402, a digital payment enablement service (e.g., Samsung Pay®, Android Pay®, Apple Pay®) suspends a payment card of the user. At step 404, the wallet server identifies the user and the payment card. At step 406, the wallet server sends transaction receipt data to a mobile wallet application. The transaction receipt data is transmitted in plain text and includes only a status of the transaction and a partial account identity. At step 408, the mobile wallet application receives the transaction receipt data from the wallet server. At step 410, the mobile wallet application suspends the payment card of the user.

FIG. 4b shows a schematic diagram 450 illustrating a conventional pull model for a contactless transaction using a mobile wallet application. At step 412, a user performs a contactless transaction via the mobile wallet application. At step 414, the mobile wallet application displays the transaction submission screen. At step 416, a digital payment enablement service notifies a wallet server of a new transaction. At step 418, the wallet server, which may administer the mobile wallet application, acknowledges the digital payment enablement service after successfully receiving the notification. At step 420, the wallet server notifies the mobile wallet application of the new transaction. The notification to the mobile wallet application may be via a platform specific push notification channel. At step 422, the mobile wallet application retrieves the latest transactions from the wallet server based on a last timestamp on the mobile wallet application.

At step 424, the wallet server retrieves the transaction history from the digital payment enablement service and subsequently receives the transaction history from the digital payment enablement service at step 426. At step 428, the wallet server transmits the latest transactions to the mobile wallet application. At step 430, the mobile wallet application identifies a latest transaction receipt by matching a last transaction identity that is stored in the mobile wallet application. The last transaction identity may be generated when the user performs the contactless transaction at step 412. At step 432, the mobile wallet application displays the transaction receipt to the user.

FIG. 4c shows a schematic diagram 480 illustrating a conventional pull model for a remote transaction. At step 434, a user performs a remote transaction via a mobile wallet application. At step 436, the mobile wallet application authorizes a checkout of a product the user purchases to a wallet server. At step 438, the wallet server transacts an application program interface call to a digital payment enablement service. At step 440, the digital payment enablement service transmits transaction credentials to the wallet server.

At step 442, the wallet server computes a transaction identity based on an algorithm defined in the digital payment enablement service application program interface specification. At step 444, the wallet server creates a mapping of a wallet identity and a transaction identity. The server stores this mapping in a checkout table in its database. At step 446, the wallet server transmits the checkout authorization to an issuer associated with an account of the user. At step 448, the digital payment enablement service notifies the wallet server of the availability of a new transaction. At step 452, the wallet server may identify a mapped device based on whether a cloud-based digital secure remote payment and a static token are available. At step 454, the wallet server notifies the mobile wallet application of the new transaction. The notification to the mobile wallet application may be via a platform specific push notification channel. At step 456, the mobile wallet application retrieves the latest transactions from the wallet server based on a last timestamp on the mobile wallet application.

At step 458, the wallet server retrieves the transaction history from the digital payment enablement service and subsequently receives the transaction history from the digital payment enablement service at step 460. At step 462, the wallet server transmits the latest transactions to the mobile wallet application. At step 464, the mobile wallet application identifies a latest transaction receipt by matching a last transaction identity that is stored in the wallet server. The last transaction identity may be generated when the user performs the remote transaction at step 434. At step 468, the mobile wallet application displays the transaction receipt to the user.

However, the pulling of the transaction receipt requires multiple communication exchanges or hops among various servers and may be time consuming. For example, after the successful payment of a contactless transaction, the device has to communicate with the acquirer server, which in turn communicates with the issuer server associated with the user's account to retrieve the transaction details. Subsequently, the issuer server has to search the list of transactions based on a time stamp of the transaction and a transaction identifier, both included in the transaction details before forwarding the receipt to the device via the acquirer server, thereby taking up time when communicating across the different servers.

Further, the transaction receipts provided by the conventional systems do not show full transaction details (or "details"). Transaction receipts provided by the conventional systems only show partial transaction details, such as date and time of a transaction, a merchant identity, a price of product, etc. and do not show other details that help to further describe the transaction such as product description, user device details, merchant business registration number etc.

In the event that certain confidential information in transaction details, such user device details, are not used for fraudulent purposes, a secure delivery of the transaction receipt to the consumer is required. Such secure delivery of transaction receipts as aforementioned is also not present in conventional systems.

A need therefore exists to provide methods and systems for sending a transaction receipt without first sending a request for it, that addresses one or more of the above problems, so that the consumer may receive the transaction receipt with full details of the transaction securely and quickly after a payment of the product is completed.

Furthermore, other desirable features and characteristics will become apparent from the subsequent detailed description and the appended claims, taken in conjunction with the accompanying drawings and this background of the disclosure.

SUMMARY

This section provides a general summary of the disclosure, and is not a comprehensive disclosure of its full scope or all of its features. Aspects and embodiments of the disclosure are set out in the accompanying claims.

According to a first aspect of the present disclosure, there is provided a server for sending transaction receipt details for a user-initiated transaction request, the server comprising: at least one processor; and at least one memory including computer program code; the at least one memory and the computer program code configured to, with the at least one processor, cause the server at least to: receive, from an issuer server, an approval message approving the user-initiated transaction request and transaction receipt details indicating a completion of the user-initiated transaction request, the user-initiated transaction request having corresponding transaction request details including a unique device identifier identifying a payment device that has been used to initiate the user-initiated transaction request; encrypt the transaction receipt details to provide encrypted transaction receipt details; and push, to the payment device identified by the unique device identifier, the encrypted transaction receipt details via a push notification channel.

In an embodiment, the server is further caused to generate a unique transaction identifier identifying the user-initiated transaction, the unique transaction identifier being included the transaction receipt details.

In an embodiment, the server is further caused to generate an encryption key to encrypt the transaction receipt details based on the unique device identifier identifying the payment device, the encryption key corresponding to the unique device identifier.

In an embodiment, the server is further caused to generate a unique user identifier identifying a user who initiates the transaction request; and generate the encryption key to encrypt the transaction receipt details based on the unique device identifier identifying the payment device and the unique user identifier identifying the user, the encryption key corresponding to the unique device identifier.

In an embodiment, the server is further caused to aggregate a plurality encryption keys into a table of encryption keys; and store the table of encryption keys into a database.

In an embodiment, the server is further caused to generate a decryption key to decrypt the transaction receipt details; and transmit the decrypted transaction receipt details to the user device identified by the unique device identifier included in the transaction receipt details.

In an embodiment, the server is further caused to: prior to receiving, from the issuer server, the approval message, receive, from the payment device, transaction request details corresponding to the user-initiated transaction request, the transaction request details indicating a product to be purchased; retrieve, from the database, a description corresponding to the product indicated in the transaction request details in response to the receipt of the transaction request details; and provide the description to the transaction receipt details.

In an embodiment, the server is further caused to generate a notification message notifying the issuer server that the transaction receipt details has been decrypted.

In an embodiment, the server is further caused to: prior to receiving, from the issuer server, the approval message, receive, from the payment device, the transaction request details corresponding to the user-initiated transaction request, the transaction request details indicating a merchant from which the product is to be purchased; retrieve, from the database, a merchant identifier corresponding to the merchant indicated in the transaction request details in response to the receipt of the transaction request details; and provide the merchant identifier to the transaction receipt details.

In an embodiment, the transaction receipt details may comprise at least one of a date and time of the user-initiated transaction request, a merchant identifier, a price corresponding to the product, the description corresponding to the product, account data, payment device data and merchant data.

In an embodiment, the push notification channel may comprise one of Apple Push Notification Service (APNS), Google Cloud Messaging (GCM), Firebase Cloud Messaging (FCM), Sockets and Windows Push Notification Services (WNS).

According to a second aspect of the present disclosure, there is provided a computer-implemented method for sending transaction receipt details for a user-initiated transaction, the method comprising: receiving, from an issuer server, an approval message approving the user-initiated transaction request and transaction receipt details indicating a completion of the user-initiated transaction request, the user-initiated transaction request having corresponding transaction request details including a unique device identifier identifying a payment device that has been used to initiate the user-initiated transaction request; encrypting the transaction receipt details to provide encrypted transaction receipt details; providing, to the payment device identified by the unique device identifier, the encrypted transaction receipt details; generating a unique transaction identifier identifying the user-initiated transaction, the unique transaction identifier being part of the transaction receipt details; generating an encryption key to encrypt the transaction receipt details based on the unique device identifier identifying the payment device; applying the encryption algorithm to the transaction receipt details; aggregating a plurality encryption keys into a table of encryption keys; and storing the table of encryption keys into a database.

In an embodiment, the method further comprises generating a unique user identifier identifying a user who initiates the transaction request; and generating the encryption key to encrypt the transaction receipt details based on the unique device identifier identifying the payment device and the unique user identifier identifying the user.

In an embodiment, the method further comprises generating a decryption key to decrypt the transaction receipt details; and displaying the decrypted transaction receipt details to the user.

In an embodiment, the method further comprises prior to receiving, from the issuer server, an approval message, receiving, from the payment device, transaction request details corresponding to the user-initiated transaction request, the transaction request details indicating a product to be purchased; retrieving, from a database, a description corresponding to the product indicated in the transaction request details in response to the receipt of the transaction request details; and providing the description to the transaction receipt details.

In an embodiment, the method further comprises after decrypting the transaction receipt details, generating a notification message notifying the issuer server that the transaction receipt details has been transmitted.

In an embodiment, the method further comprises prior to receiving, from the issuer server, an approval message, receiving, from the payment device, transaction request details corresponding to the user-initiated transaction request, the transaction request details indicating a merchant from which the product is purchased; retrieving, from a database, a merchant identifier corresponding to the merchant indicated in the transaction request details in response to the receipt of the transaction request details; and providing the merchant identifier to the transaction receipt details.

According to a third aspect of the present disclosure, there is provided a computer-implemented method for sending transaction receipt details for a user-initiated transaction, the method comprising: receiving a user-initiated transaction request having transaction request details indicating a product to be purchased; and receiving an encrypted transaction receipt, the transaction receipt including transaction request details; generating a decryption key to decrypt the encrypted transaction receipt; and displaying the transaction receipt including the transaction request details.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Aspects of the present disclosure will now be described by way of example with reference to the accompanying figures. With that said, embodiments of the disclosure will be better understood and readily apparent to one of ordinary skill in the art from the following written description, by way of example only, and in conjunction with the drawings, in which:

FIG. 2d shows a flow chart illustrating a computer-implemented method 255 for sending a transaction receipt from an application program perspective according to an example embodiment.

Corresponding reference numerals indicate corresponding parts throughout the several views of the drawings.

DETAILED DESCRIPTION

Figure 1:
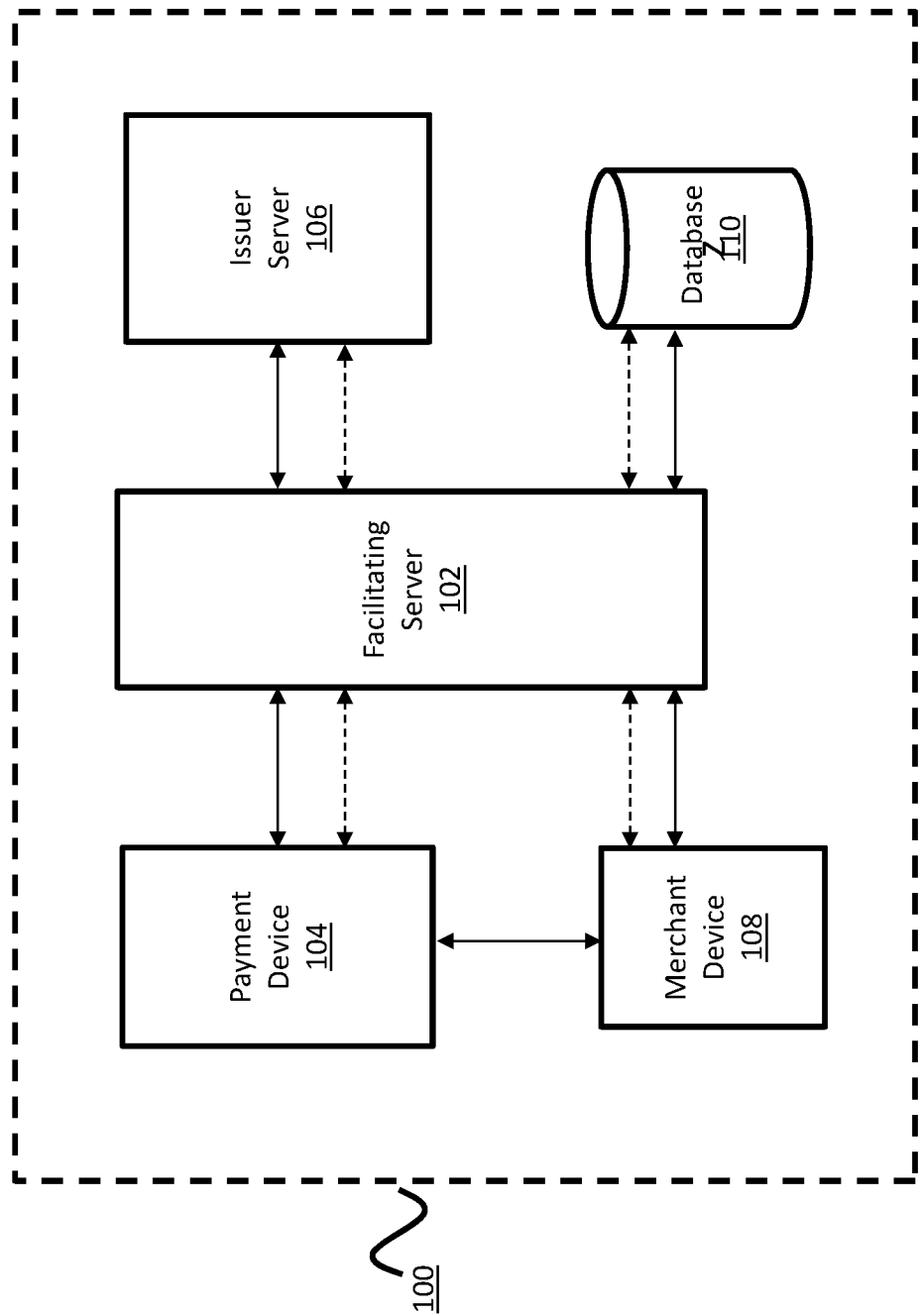
FIG. 1 shows a block diagram of a system 100 within which a transaction receipt can be securely sent, according to an example embodiment.

Various embodiments of the present disclosure provide a server and a method that sends a transaction receipt, more specifically securely sending a transaction receipt to a user via push notification.

A user may install and activate an application program to make payment for a product. The user may register himself on the application program by providing user and account details. The application program may be stored in a payment device, for example a smartphone, and the user may also utilize a payment function on the application program. In use, the user visits a merchant store and purchases a product. In various embodiments, a facilitating server manages the registration of application program. Upon the successful registration of the user in the application program, a decryption key corresponding to the user's details may be generated and sent to the user. The user proceeds to check-out the product at a point-of-sale (POS) terminal of the merchant and uses the application program in his payment device to initiate a contactless payment for the product. In various embodiments, checking out the product may mean sending the transaction request to the merchant.

Alternatively, the user may visit the website of the merchant for an online purchase. In this case, the application program may be configured to show the merchant website. The user selects the products to purchase from the application program and proceeds to initiate a remote payment for the products using the application program. The user initiates the payment and a payment submission message may be displayed to the user via the application program. The transaction in the embodiment as described above corresponds to a remote transaction.

After payment has been approved and processed by an issuer that is associated with a user's account, the issuer transmits transaction receipt details to a facilitating server via an issuer server. The issuer server may be one that is managed by the issuer while the facilitating server may be one that facilitates communication between different parties without having multiple communication hops among various servers. The transaction receipt details may include data corresponding to the transaction. The facilitating server subsequently generates an encryption key to encrypt the transaction receipt details and sends the encrypted transaction receipt without the encryption key to the application program executing on the user's payment device.

The application program receives the encrypted transaction receipt and decrypts the transaction receipt using the generated decryption key. The application program then proceeds to display data of the transaction to the user via the payment device.

A user refers to a consumer who purchases a product and/or service (or "a good") from a merchant and may register himself as a registered user on an application program. In the following disclosure, "user" generally refers to a person who is registered on the application program while the term "consumer" generally refers to a person who purchases goods from the merchant. It may be appreciated that "user" and "consumer" may be used interchangeably in various embodiments. The merchant may be registered as a registered merchant on the application program and advertises his goods on the application program. Thus, the registered user is able to view currently available goods from various merchants who may be registered merchants on the application program. Alternatively, the product may be available at a physical store of the merchant at which the consumer (or user) visits and purchases a product using the application program. The product may also be available online at the merchant's website and the user may use the application program to purchase the product. The application program may be configured to view the merchant's website. In use, the user selects the products to purchase from the website via the application program and proceeds to initiate a remote payment for the products using the application program. Information relating to the product (e.g., a price of the product and a description of the product) may be obtained from the application program using a barcode, a Quick Response (QR) code, a Near Field Communication (NFC) chip or a NFC tag. For example, the user may use the application program to scan a QR code attached on the product. Subsequently, product information may be shown to the user through the application program. In another example, the product information may be presented to the user when the application program is placed in close proximity to a NFC tag on the product.

A payment device refers to a device on which payment for a good can be made. In the following disclosure, the payment device may belong to the user (i.e., a user device) and may be a portable computing device on which he is able to install and view the application program. In other words, the user may register as a registered user of the application program executing on the payment device. Examples of such a device may include, but are not limited to, a mobile phone, a laptop, a smart television, a smart watch or a tablet.

An application program refers to a comprehensive, self-contained program that performs a particular function directly for the user. Examples of an application program include a word processor, a spreadsheet, an accounting application, a web browser, a media player or a photo editor. The application program may be installed in the payment device of the user and may allow the user to pay for the good he is purchasing. For example, the application program may be used in a contactless transaction whereby the user scans his mobile phone at the POS terminal of the merchant during a check-out. The application program may be configured to show the merchant's website such that the user may be able to purchase goods online. The application program can act as an intermediary between the merchant and the user to facilitate the purchase of goods. In various embodiments, the application program may display the product information to the user during purchase and also display transaction receipt details to the user after approval of the transaction. The application program may also facilitate payment between the issuer and the merchant by transmitting the transaction request to the issuer, receiving approval of the transaction from the issuer and forwarding the approval to an acquirer which may administer an account of the merchant. In an example embodiment, the application program may be compatible with an existing payment program, e.g., Masterpass®, which the application program displays to the user so that he may choose the preferred payment method to purchase the product.

A payment facilitator is an intermediary that links the different parties involved in a financial transaction. For example, when a user uses his credit card at the payment device to initiate a transaction request (or a user-initiated transaction request), the payment facilitator may route the transaction request from the payment terminal to the issuer and may route an approval from the issuer to the acquirer. The payment facilitator may also settle financial transactions through a facilitation of the transfer of monetary value, and includes the institutions, instruments, rules, procedures, standards, and technologies that make such an exchange possible, A common type of payment facilitator is one that manages rules for accounts that maybe issued by issuers and facilitates funds exchange between accounts. Therefore, the payment facilitator may connect the issuer associated to an account of the user and the merchant for the transfer of funds between the issuer and the merchant. The payment facilitator may also generate programming codes (such an encryption key or a decryption key) and instructions relating to the transaction.

Transaction receipt (or invoice) details refer to data relating to the transaction after payment of the transaction is completed. More specifically, the data includes information included in a transaction request requesting to purchase a product. Examples of transaction receipt details may include the date and time at which the transaction request is initiated, a merchant identifier (e.g., a merchant registration number), the price of the product, the description of the product, account details of the account used for the transaction and payment device details. In a typical transaction, the user receives two receipts, one from the merchant and another from the issuer. The receipt from the merchant generally only show the merchant name and address, the date and time at which the transaction request is initiated, the name of each product and the price of each product. The receipt from the issuer generally only show partial card details, price of the transaction and date and time of transaction. That is, the price of each product is not shown. A full transaction detail receipt may include details of both of these receipts previously mentioned in a single receipt. Additional information may also be shown in the single receipt, such as payment device details, merchant product code, merchant transaction identifier and a time stamp of the transaction indicated at a merchant point-of-sale (POS) terminal.

Encryption refers to the process of converting ordinary information, such as a transaction receipt in this case, into unintelligible text while decryption refers to converting from the unintelligible text (or encrypted text) back to plaintext. This provides secure communication of data (e.g., the transaction receipt) between different parties. A key consisting of a short string of characters or code, usually in secret and known only to the communicants, may be required to create the encryption and the reversing decryption. An encryption key or a decryption key in this case may thus be the same code.

A push notification refers to a message that is "pushed" from the server to the application program, e.g., mobile applications and desktop applications. In various embodiments, "push" means automatically sending the message without prompting or without being requested by the user. In an embodiment, a push notification may be one in which a message may be displayed as a "pop-up" on a payment device. The push notification may be accompanied with alert sounds. The notification may also be sent with images and hypertext link in some cases. The transaction receipt in this case is securely sent to the payment device, e.g., the user's mobile phone, via push notification from the server. In an embodiment, the push notification is sent via a push channel. This is, in contrast to pull notifications, whereby a device "pulls" the transaction receipt from the server. The pull notification is the more conventional approach, whereby the user requests for the transaction receipt from the server.

In various embodiments, a push notification is one that is sent to a corresponding device without having the corresponding device to request for it. It may also be referred as proactively sending a notification. The corresponding device is usually one that initiates a process that causes the push notification. In the example of the push notification being a transaction receipt, the transaction receipt including the full transaction details is sent automatically to the corresponding device after the transaction is approved.

Embodiments of the present disclosure will be described, by way of example only, with reference to the drawings. The description and specific examples included herein are intended for purposes of illustration only and are not intended to limit the scope of the present disclosure. Again, like reference numerals and characters in the drawings refer to like elements or equivalents.

FIG. 1 illustrates a block diagram of a system 100 within which a transaction receipt can be securely sent via a push notification. The system 100 comprises a facilitating server 102 in communication with a payment device 104, an issuer server 106, a database 110 and a merchant device 108 and the payment device 104 is in communication with the merchant device 108.

The payment device 104 is typically associated with a user (or consumer) who purchases a merchant's product and initiates a transaction at the payment device 104 or the merchant device 108. The transaction may be a contactless transaction. The payment device 104 may be a fixed (wired) computing device or a wireless (portable) computing device. In specific implementations, the payment device 104 may be a handheld or portable or mobile device carried or used by the user, or may refer to other types of electronic devices such as a personal computer, a land-line telephone or an interactive voice response (IVR) system and the like. The mobile device may be a device, such as a mobile phone, a laptop computer, a personal digital computer (PDA), a mobile computer, a portable music player (such as an iPod™ and the like).

Alternatively, the transaction, for example a remote transaction, may only involve the payment device 104. In such an embodiment, the user uses the payment device 104 to purchase the merchant's product directly without using the merchant device 108 or the user without having to be physically present at the merchant's store. For example, user ABC uses an application program on his mobile phone to browse a merchant's DEF products on the merchant DEF's website and purchases a vacuum cleaner worth $300 (or a price of a product). User ABC then checks-out and pays the vacuum cleaner using the application program.

The merchant device 108 typically is associated with the merchant who is also a party to the transaction that occurs between the payment device 104 and the merchant device 108. The merchant device 108 may be a point-of-sale (POS) terminal, an automatic teller machine (ATM), a personal computer, a computer server (hosting a website, for example), an IVR system, a land-line telephone, or any type of mobile device such as a mobile phone, a personal digital assistant (PDA), a laptop computer, a tablet computer and the like. In an example embodiment of the contactless transaction described above, the user ABC visits a physical store of the merchant and initiates a transaction request (or a user-initiated transaction request) to purchase a vacuum cleaner worth $300. He uses his mobile phone (on which the application program is installed) to place in close proximity to the merchant's POS terminal. A communication link is established between the mobile phone and the POS terminal and the application program executing on the user's mobile phone initiates the transaction request.

Figure 4A:
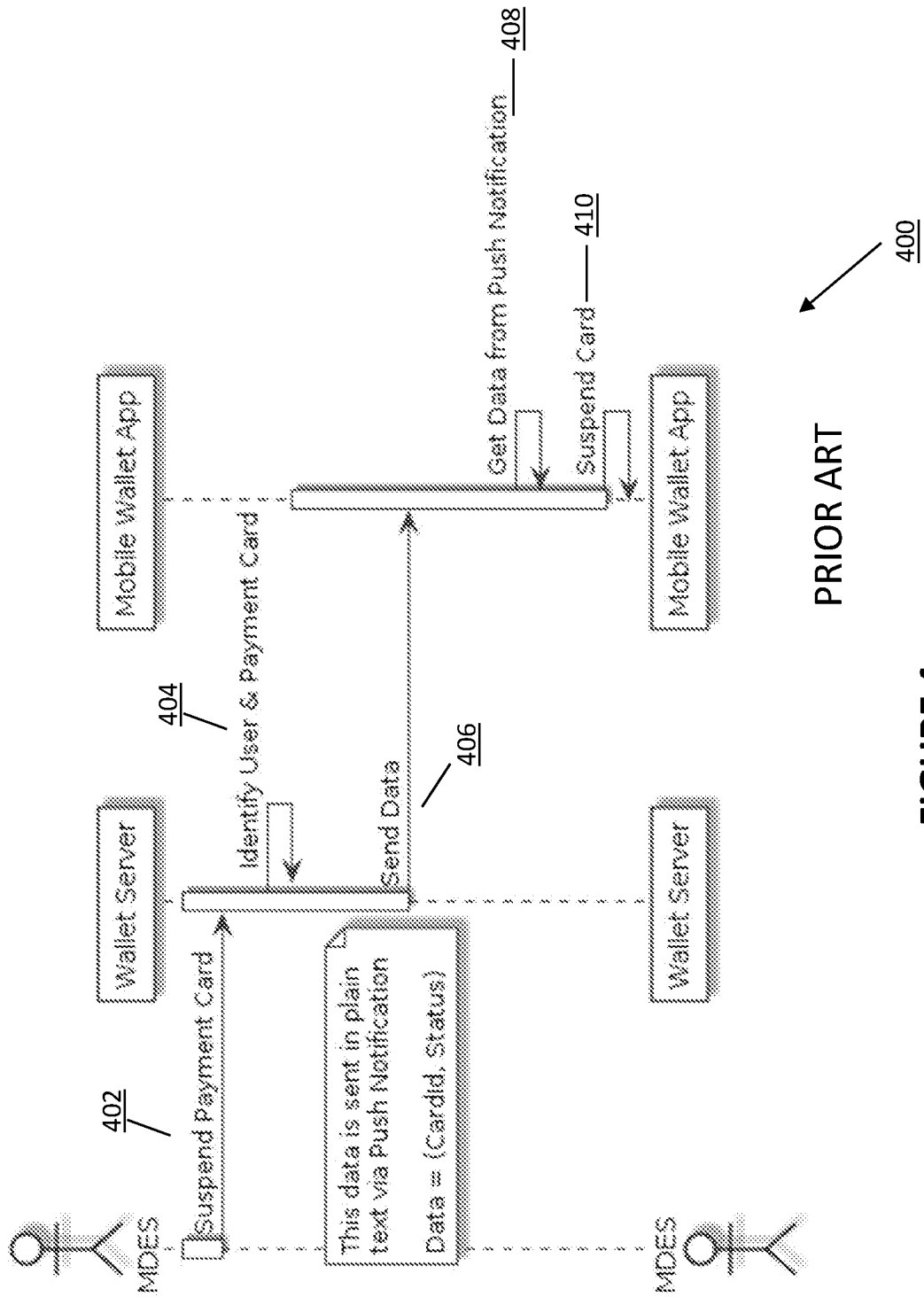
FIG. 4a shows a schematic diagram 400 illustrating a conventional pull notification mechanism.
Figure 4B:
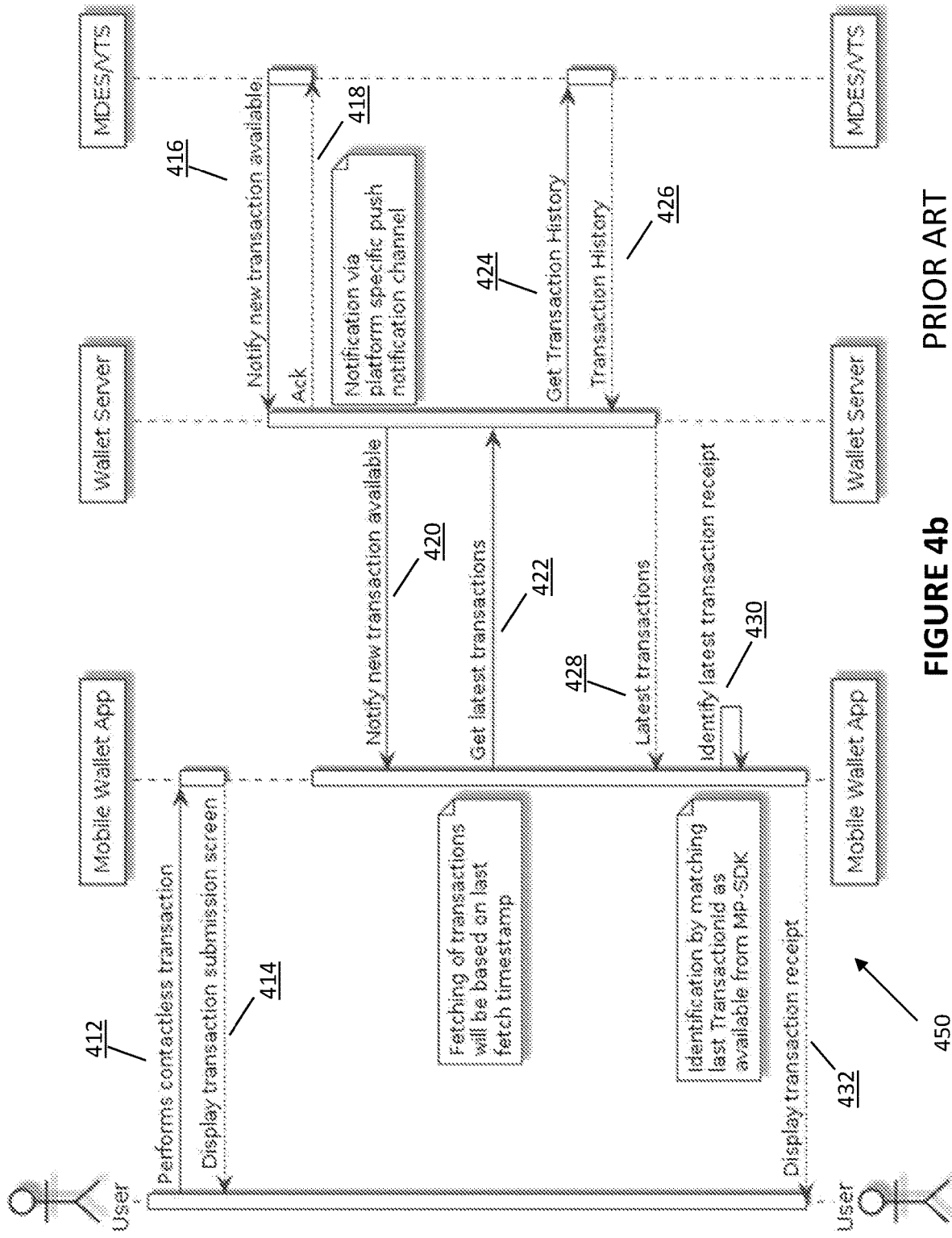
FIG. 4b shows a schematic diagram 450 illustrating a conventional pull model for a contactless transaction.
Figure 4C:
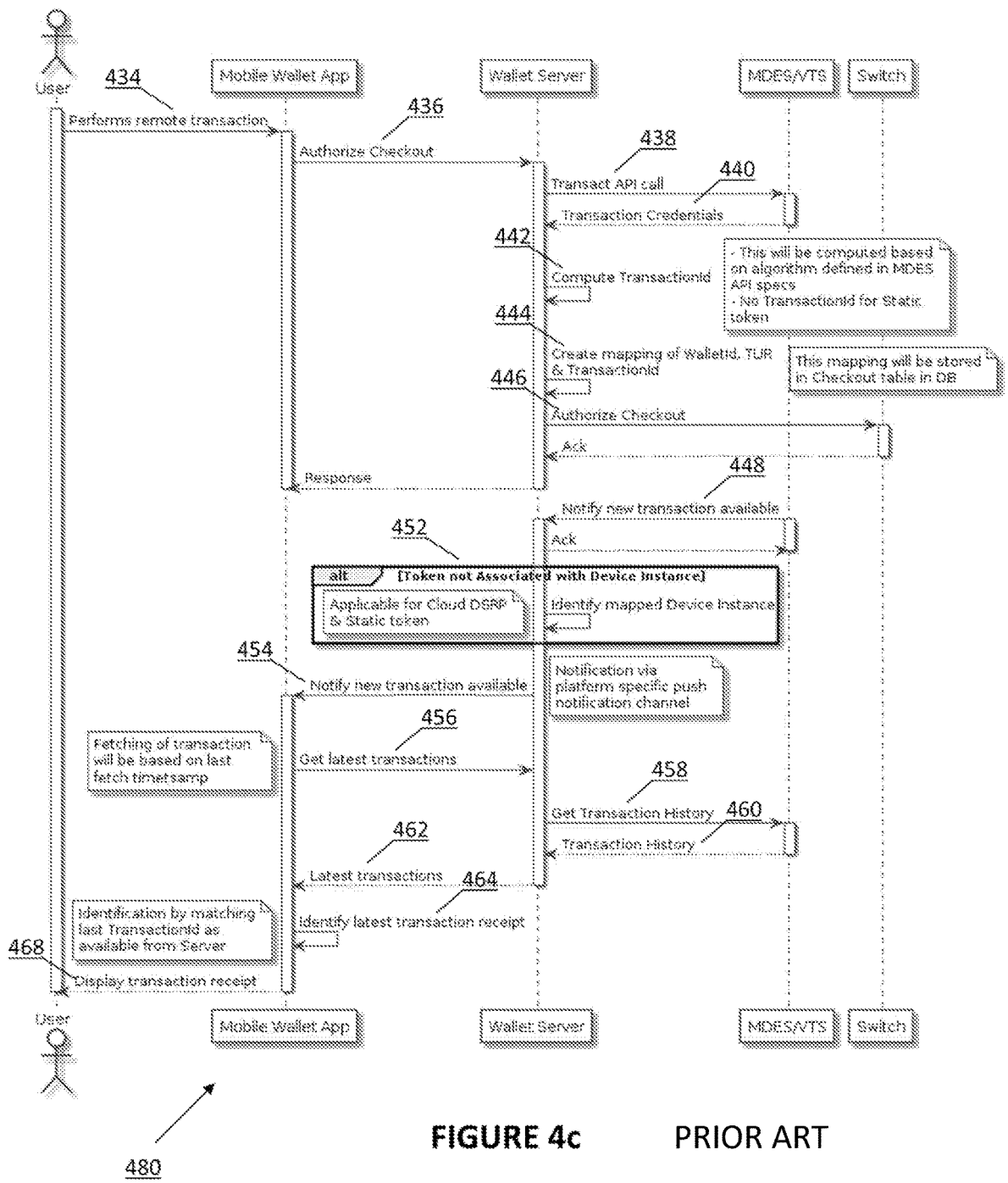
FIG. 4c shows a schematic diagram 480 illustrating a conventional pull model for a remote transaction.

The facilitating server (or a payment network server) 102 typically is associated with a payment facilitator. For example, the facilitating server 102 may be the Banknet® network operated by MasterCard®. The payment facilitator (e.g., MasterCard®) may be an entity (e.g., a company or organization) who operates to process transactions, clear and settle funds for payments between two entities (e.g., two banks). The facilitating server 102 may include one or more computing devices that are used for processing transactions. For various embodiments below, the payment facilitator (e.g., MasterCard®) may be an entity (e.g., a company or organization) which issues (e.g., establishes, manages, administers) a transaction credential or an account (e.g., a financial bank account) of the merchant. In an alternative embodiment, the facilitating server 102 may be part of a system that is administered by the merchant and is linked to the payment device 104, the merchant device 108, the database 110 and the payment facilitator. In yet another embodiment, the facilitating server may be part of a system which includes the issuer server 106 and is linked to the merchant system as described previously, the payment device 104, the database 110 and the payment facilitator. An exemplary facilitating server 102 is shown in FIG. 4.

The issuer server 106 generally is associated with an issuer and may include one or more computing devices that are used to perform a payment transaction. The issuer may be an entity (e.g., a company or organization) which issues (e.g., establishes, manages, administers) a transaction credential or an account (e.g., a financial bank account) of the consumer (or user). A user account (or account) may also refer to a payment card or a digital wallet which is administered by the issuer. The account may also be associated with the payment device 104.

The facilitating server 102 may be configured to communicate with, or may include, a database (or a transaction database) 110. The database 110 stores data corresponding to a plurality of users. Examples of the data include User ID, User Name, User Account, User Address and Postal Code, User Account details and or other relevant information that is provided when the user signs up for an application program managed by the facilitating server 102. For example, data relating to the user, such as the user's biological data are included in the database 110. The database 110 may also store data corresponding to a transaction which may be provided in the transaction receipt details. Examples of the data include Product ID, Product Description, Product Price, Transaction ID, Merchant ID, Merchant Name, MCC/Industry Code, Industry Description, Merchant Country, Merchant Address, Merchant Postal Code, Aggregate Merchant ID, Merchant Tax Registration Number, Merchant Product Code, Merchant Transaction Identifier, time stamp of the transaction indicated at a merchant point-of-sale (POS) terminal and or other relevant information that is provided when the user initiates a transaction at the application program. For example, data ("Merchant name" or "Merchant ID") relating to the merchant and the product details ("Product Description" or "Product Price") are included in the database 110. In an implementation, the database 110 may be a secure database or a Hardware Security Module (HSM) that securely stores the data which may not be assessed without valid authorisation. Examples of valid authorisation include the use of a passcode, a retina scan or a fingerprint scan.

The facilitating server 102 may also receive an approval message from the issuer server 106 approving the user-initiated transaction request and transaction receipt details indicating a completion of the user-initiated transaction request. The user-initiated transaction request may have corresponding transaction request details including a unique device identifier identifying the payment device 104 that has been used to initiate the user-initiated transaction request. The transaction receipt details may include the transaction request details and other data when the user initiates the transaction request to purchase the product, such as the date and time at which the transaction request is initiated, a merchant identifier (e.g., a merchant registration number), the price of the product, the description of the product, account details of the account used for the transaction and payment device details. The transaction receipt details may further include data after the issuer approves the payment of the product, such as partial card details, price of the transaction, date and time of transaction, payment device details, merchant product code, merchant transaction identifier and the time stamp of the transaction indicated at the merchant point-of-sale (POS) terminal. The facilitating server 102 may then encrypt the transaction receipt details to provide encrypted transaction receipt details and push the encrypted transaction receipt details to the payment device 104 identified by the unique device identifier via a push notification channel.

The payment device 104 may be capable of wireless communication using a suitable protocol with the merchant device 108. For example, embodiments may be implemented using the payment device 104 that are capable of communicating with Wi-Fi/Infrared/Bluetooth-enabled merchant device 108. It will be appreciated that these communication means serve as mere examples and other suitable communication modes may be used to establish communication between the payment device 104 and the merchant device 108. It will be appreciated by a person skilled in the art that depending on the wireless communication protocol used, appropriate handshaking procedures may need to be carried out to establish communication between the payment device 104 and the merchant device 108. For example, in the case of Bluetooth communication, discovery and pairing of the payment device 104 and the merchant device 108 may be carried out to establish communication.

During a transaction, a user-initiated transaction request is generated at the payment device 104. The user-initiated transaction request may include transaction request details indicating a product to be purchased by the user and a product amount of the product. The transaction request details may also include data indicating a merchant from which the product is purchased, details of the user who initiated the transaction request and a unique device identifier identifying the payment device 104 that is used to initiate the user-initiated transaction request. Continuing from the above example, user ABC signs up for an application program administered by the facilitating server 102. Upon registration, user ABC is now a registered user of the application program and a decryption key is generated based on user ABC's details during registration. User ABC then searches for products in the application program and chooses to purchase the $300 vacuum cleaner provided by merchant DEF. User ABC initiates a transaction request using the application program via his mobile phone (or payment device) XYZ to facilitate payment for the vacuum cleaner and the user-initiated transaction request is transmitted to the facilitating server 102. The transaction request indicates that a $300 (or product amount) vacuum cleaner (or product) from merchant DEF is to be purchased by user ABC using his mobile phone XYZ. In this case, the transaction is carried out remotely, where the user is not physically present at the merchant's store.

In another implementation, the transaction request may also be initiated at a retail shop of the merchant. In specific implementations, the payment device 104 may be fitted with a wireless communications interface such as a Near Field Communication (NFC) interface to enable the payment device 104 to electronically communicate with the facilitating server 102 to perform the transaction. NFC is a set of standards to establish radio communication between devices by bringing them into close proximity such as only a few centimetres. NFC standards cover communication protocols and data exchange formats, and are based on radio-frequency identification (RFID) technology. That is, the payment device 104 may have image capturing capabilities and capture an image of a quick response (QR) code displayed on the merchant device 108. The captured QR code includes a merchant identifier identifying the merchant and the merchant's account.

In an implementation, the merchant registers for an account on an application program executing on the merchant device 108. Upon registration, the merchant is a registered merchant of the application program. The application program is one that is managed by the facilitating server 102. At the time of registering for the account, the merchant provides information (e.g., name, a photograph, address of merchant, contact number, type of product, tax registration number etc.) to the facilitating server 102. The facilitating server 102 may verify the information which may be in a form of checking if the received information is complete or check if the received information corresponds to one in a black-list. The facilitating server 102 may generate a merchant account in response to a verification of the received information and stores the merchant's information in a database 110. The facilitating server 102 may also generate a merchant identifier corresponding to the merchant registration number provided during registration.

After receiving the transaction request details from the payment device 104, the facilitating server 102 retrieves a description corresponding to the product indicated in the transaction request details from the database 110 in response to the receipt of the transaction request details. The facilitating server 102 may also generate a unique transaction identifier identifying the transaction request. A unique user identifier identifying the user who initiates the transaction request may be generated during the successful registration of the user. The unique transaction identifier, the merchant identifier and the description corresponding to the product may then be included in the transaction receipt details. At this time, the facilitating server 102 may also generate a decryption key to decrypt the transaction receipt details based on the unique device identifier and the unique user identifier. The decryption key may include a random decryption algorithm to decrypt the transaction receipt details and the facilitating server 102 may store the decryption key in the database 110.

The facilitating server 102 transmits the transaction request to the issuer server 106 associating with an issuer of the user account. The issuer server 106 then determines whether the user's account has sufficient funds to pay for the product. If there are sufficient funds, the issuer server 106 sends an approval message to the facilitating server 102 approving the user-initiated transaction request and transaction receipt details indicating a completion of the user-initiated transaction request. The transaction receipt details may include the description of the product, the merchant identifier, the unique transaction identifier and the unique user identifier. On the other hand, if there are insufficient funds in the user's account, the issuer server 106 sends a refusal message refusing the user-initiated transaction request.

With reference to the earlier example, the user-initiated transaction request indicates that user ABC is buying the $300 vacuum cleaner from merchant DEF. The facilitating server 102 generates a transaction identity X1Y2 to identify the particular transaction request. The facilitating server 102 then retrieves from the database 110, the detailed description of the vacuum cleaner, such as brand GHJ model XV-103 having a power rating of 300 W. The facilitating server 102 also retrieves, from the database 110, the details of merchant DEF, such as DEF's address, postal code and tax registration number. The facilitating server 102 then includes the retrieved information to the transaction receipt details.

The facilitating server 102 then generates an encryption key to encrypt the transaction receipt details based on the unique device identifier identifying the payment device 104 such that the encryption key corresponds to the unique device identifier. The encryption key may also be generated based on the unique user identifier identifying the user or may be generated based on both the unique device identifier identifying the payment device 104 and the unique user identifier identifying the user such that the encryption key corresponds to the unique device identifier. In an alternative embodiment, the encryption key may be generated based on the previously generated decryption key, which is also based on the unique device identifier and the unique user identifier.

The encryption key may be generated using a secure method, such as a random number generator or a pseudo-random number generator. The encryption key may also be generated in response to the transaction request (i.e., at runtime) such that storage of the generated encryption keys is not required. As the generated encryption key is closely associated with the received transaction request, secure delivery of the transaction receipt may be realized even if there is duplication of the encryption key for another transaction request.

The encryption key will include a random encryption algorithm to encrypt the transaction receipt details. The facilitating server 102 then applies the encryption algorithm on the transaction receipt details and "pushes" (or sends without prompting) the encrypted transaction receipt details to the payment device 104 that is identified by the unique device identifier. Such push notification of the transaction receipt may allow proactive delivery of the transaction receipt so that multiple communication hops between different parties are not necessary. That is, the facilitating server 102 is configured to encrypt and push the transaction details in response to a receipt of an approval message from the issuer server approving the user-initiated transaction request and transaction receipt details indicating a completion of the user-initiated transaction request. Therefore, the transaction receipt, including the transaction receipt details, is sent to the payment device 104 without any pull request from the user or the payment device 104. This may ensure faster delivery of the transaction receipt to the user. Coalescing the encryption algorithm with the transaction receipt details may also ensure secure and accurate transmission of the transaction receipt in order to prevent unauthorized access to the transaction receipt. The facilitating server 102 may also aggregate a plurality encryption keys into a table of encryption keys and store the table of encryption keys into the database 110.

The payment device 104 generates a decryption key to decrypt the encrypted transaction receipt details. The decryption key may include a random decryption algorithm to decrypt the transaction receipt details. The payment device 104 then decrypts the encrypted transaction receipt details using the decryption key and displays the full transaction receipt details to the user via the payment device 104. After decrypting the transaction receipt details, the facilitating server 102 generates a notification message notifying the issuer server 106 that the transaction receipt details have been decrypted.

At the same time, the facilitating server 102 forwards a notification message to the merchant device 108 informing the merchant who is providing the product that the product amount has been transferred. The facilitating server 102 may also allocate a corresponding reward (e.g., loyalty points) to the user after the transaction is approved by the issuer server 106.

As mentioned above, the role of the facilitating server 102 is to facilitate communication between the payment device 104, the issuer server 106 and/or the merchant device 108. In specific implementations, the facilitating server 102 is further configured to perform additional operations. For example, the facilitating server 102 may be configured to update the database 110 whenever the user receives the corresponding reward (e.g., loyalty points). The facilitating server 102 may also be configured to update the database 110 whenever a merchant registers for an account or the merchant has a new product which he wishes to advertise. Additionally, the facilitating server 102 may also be configured to calculate a reliability score for each user based on the historical transactions (including repayment of loans) relating to the user. The historical transactions may be a ledger or a record of transactions that have been carried out using the account.

Figure 2A:
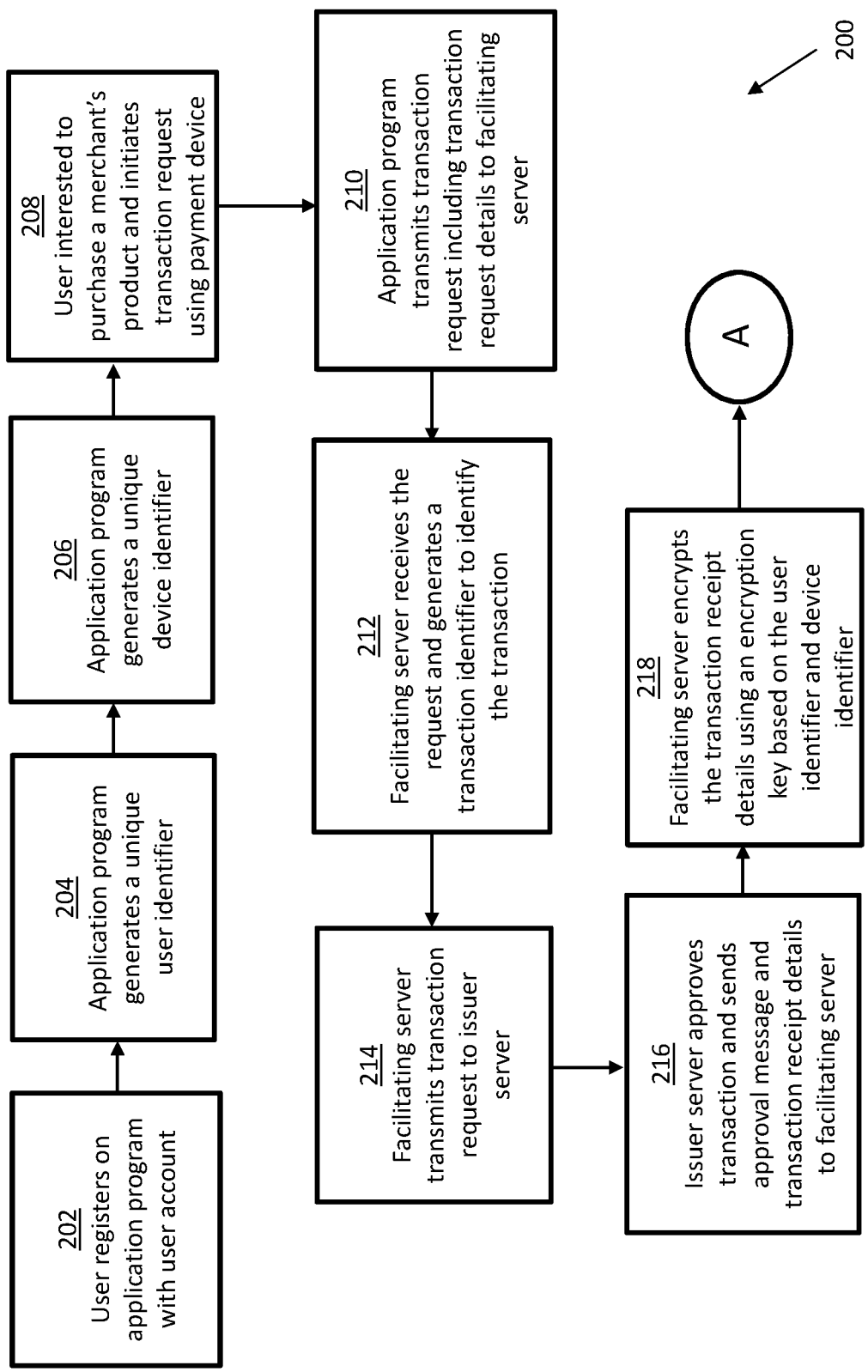
FIGS. 2a to 2b show a flow chart illustrating a computer-implemented method 200 for sending a transaction receipt according to an example embodiment.
Figure 2B:
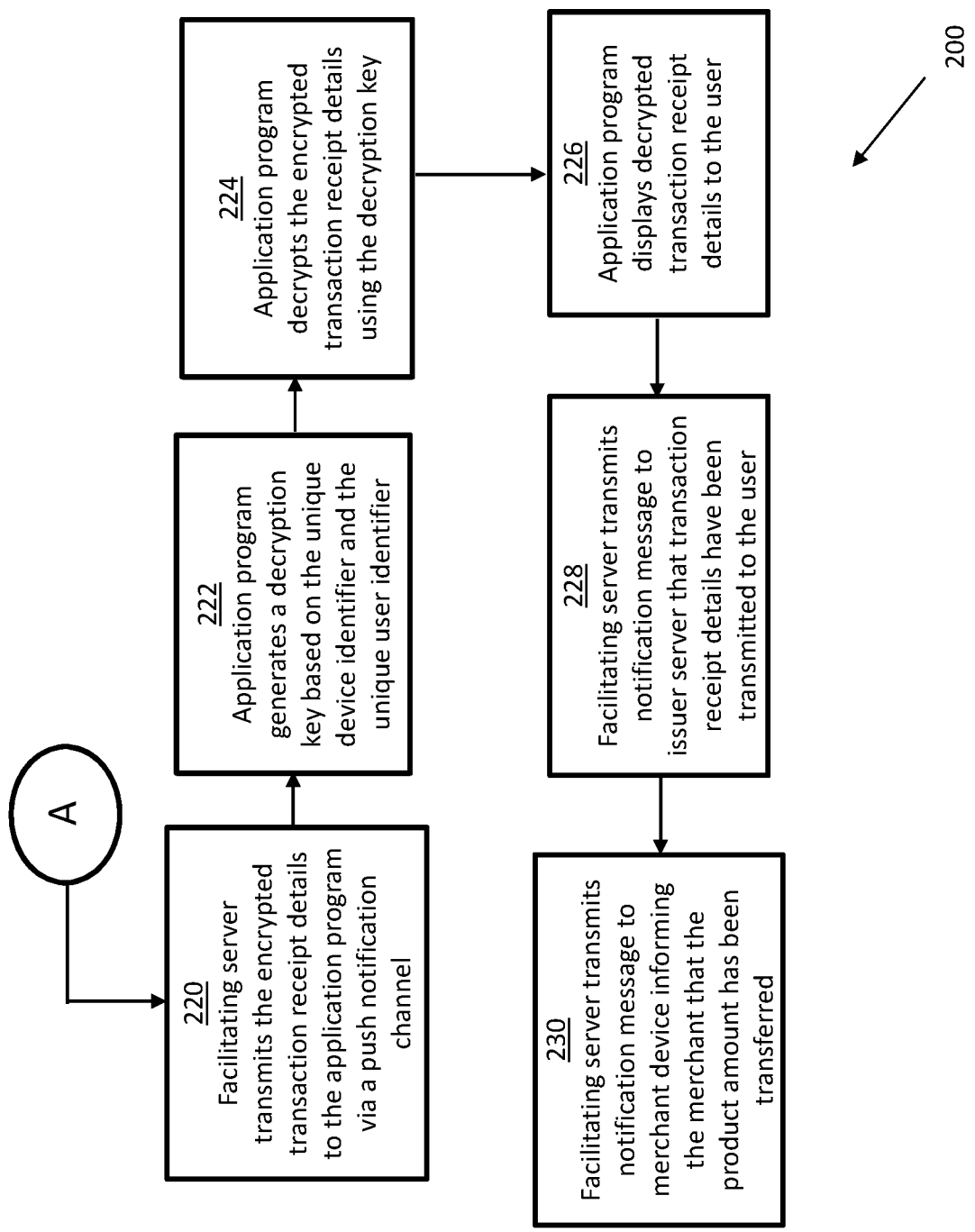

Such a server may be used to implement the method 200 shown in FIGS. 2a and 2b. FIGS. 2a and 2b shows a flowchart illustrating a method 200 for sending a transaction receipt according to an example embodiment.

The method 200 broadly includes at step 202, a user registers on an application program having his user account. The application program may be installed on a payment device with which the user may use to purchase products or services. At step 204, the application program generates a unique user identifier after the user is registered successfully. The unique user identifier may be stored in the database 110. At step 206, the application program (installed on the payment device) generates a unique device identifier. The unique device identifier may be stored in the database 110 for tracking purposes. At step 208, the user is interested to purchase a merchant's product and initiates a transaction request using the payment device. The user may initiate the transaction request as a contactless transaction using his payment device at a POS terminal located at the merchant's physical retail store. Alternatively, the merchant may be a registered merchant of the application program and the user may view the merchant's products via the application program and initiate a remote transaction request to purchase the merchant's product.

At step 210, the application program transmits the transaction request including transaction request details to the facilitating server. The transaction request details may include the date and time at which the transaction request is initiated, the unique merchant identifier, the price of the product, the description of the product, account details of the account used for the transaction, payment device details and the merchant business registration number. At step 212, the facilitating server generates a unique transaction identifier to identify the transaction upon receiving the transaction request. At step 214, the facilitating server transmits the transaction request to the issuer server. At step 216, the issuer server approves the transaction and sends an approval message and transaction receipt details to the facilitating server. The issuer server may determine if the user has sufficient funds to pay for the product before approving the transaction. Further, the issuer server may also transmit data such as card details, an amount deducted from the user's account and a date and time of the transaction approval to be included in the transaction receipt details. At step 218, the facilitating server may encrypt the transaction receipt details using an encryption key based on the unique user identifier and the unique device identifier. The transaction receipt details may include transaction request details during initiation of the transaction request by the user and data provided by the issuer server after the approval of the transaction.

Continuing from FIG. 2a, at step 220 in FIG. 2b, the method further includes the facilitating server transmitting the encrypted transaction receipt details to the application program via a push notification channel. Examples of the push notification include Apple Push Notification Service (APNS), Google Cloud Messaging (GCM), Firebase Cloud Messaging (FCM), Sockets and Windows Push Notification Services (WNS). APNS provides remote push notifications that may be robust, secure and highly efficient to propagate information to devices, such as the payment device 104. During the execution of the application program on the payment device 104, an accredited, encrypted, and persistent Internet Protocol (IP) connection may be established between the application program and APNS in order to enable the application program to receive notifications. In addition, the application program may be further configured with APNS using cryptographic certificates in order to send push notifications. Upon the completion of the setup between APNS and the application program, APNS sends corresponding push notifications to each targeted device. On receipt of a notification, APNS delivers the information in the notification to the appropriate application program executing on the payment device 104. If a notification for arrives when the payment device 104 is powered on but with the application program not running, APNS may still display the notification. If the payment device 104 is powered off when APNS sends a notification, APNS holds on to the notification and tries again later. A FCM or GCM push notification channel may employ a trusted environment such as Cloud Functions for Firebase on which to build, target and send messages. FCM or GCM may distribute messages to the application program in any of the following three ways—to single devices, to groups of devices, or to devices subscribed to topics. FCM or GCM may also send notification or data messages that are displayed to the user and also send acknowledgments, chats, and other messages from the payment device 104 (or devices) back to the facilitating server 102 a FCM or GCM connection channel that can be reliable and battery-efficient.

A socket (or a network socket) is an endpoint of a two-way communication link between the facilitating server 102 and the application program. The socket is bound to a port number on the facilitating server 102 so that the facilitating server 102 can identify the application program which the notification is to be sent. During an initial setup, a connection request is initiated by the application program to the facilitating server 102. The application program identifies itself to the facilitating server 102 by providing details so that a local port number will be assigned to the application program that it will use during this connection. A socket is created after acceptance by the facilitating server 102 so that communication between the facilitating server 102 and the application program is established by writing to or reading from the socket. For WNS push notification, the application program requests a push notification channel from the Universal Windows Platform. Windows asks WNS to create a notification channel. This channel is returned to the calling device in the form of a Uniform Resource Identifier (URI). The notification channel URI is returned by Windows to the application program. The application program sends the URI to the facilitating server 102 to be stored so that the URI can be accessed when notifications are sent. When the facilitating server 102 has an update to send, it notifies WNS using the channel URI. This is done by issuing a request, including the notification payload, over Secure Sockets Layer (SSL) which requires authentication with WNS. WNS then receives the request and routes the notification to the application program running on the payment device 104.

At step 222, the application program generates a decryption key based on the unique device identifier and the unique user identifier. It can be appreciated that the decryption key may be generated after the unique device identifier and the unique user identifier are generated at step 206. In other words, as the encryption key and the decryption key are similarly based on the unique device identifier and the unique user identifier, the decryption key and the encryption key may be considered as symmetric keys. Thus, the decryption key and the encryption key may be re-generated whenever required such that the encryption key may be generated from the decryption key and vice versa. At step 224, the application program decrypts the encrypted transaction receipt details using the generated decryption key. At step 226, the application program displays the decrypted transaction receipt details to the user. At step 228, the facilitating server transmits a notification message to the issuer server that the transaction receipt details have been transmitted to the user. At step 230, the facilitating server transmits another notification message to the merchant device informing the merchant that the product amount has been transferred.

Figure 2C:
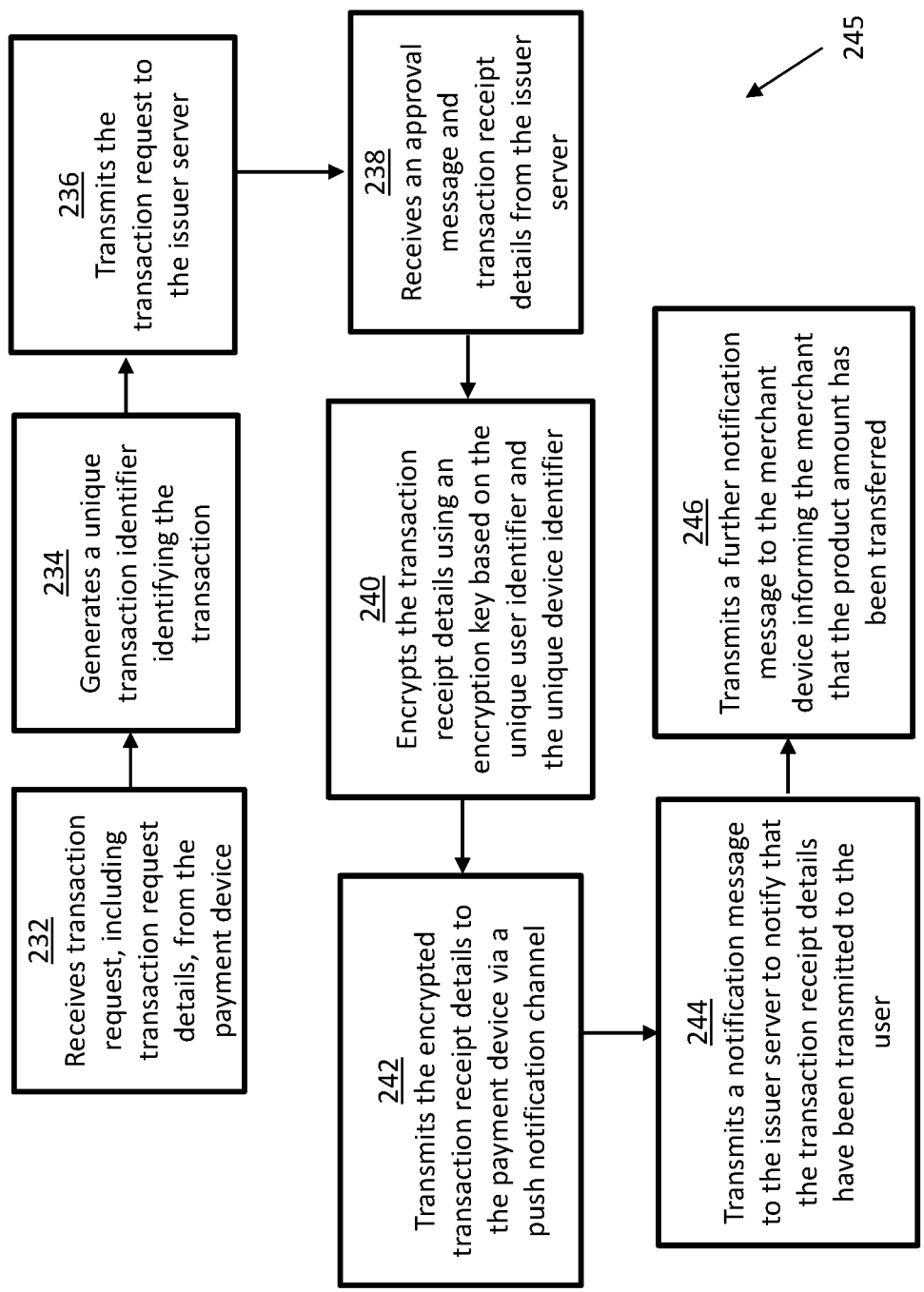
FIG. 2c shows a flow chart illustrating a computer-implemented method 245 for sending a transaction receipt from a facilitating server perspective according to an example embodiment.

FIG. 2c shows a flow chart illustrating a computer-implemented method 245 for sending a transaction receipt from a facilitating server perspective according to an example embodiment. At step 232, the facilitating server 102 receives a transaction request, including transaction request details, from the payment device 104. The transaction request details may include a unique user identifier and a unique device identifier. At step 234, the facilitating server 102 generates a unique transaction identifier identifying the transaction. At step 236, the facilitating server 102 transmits the transaction request to the issuer server 106. At step 238, the facilitating server 102 receives an approval message and transaction receipt details from the issuer server 106. At step 240, the facilitating server 102 encrypts the transaction receipt details using an encryption key based on the unique user identifier and the unique device identifier. At step 242, the facilitating server 102 transmits the encrypted transaction receipt details to the payment device 104 via a push notification channel. At step 244, the facilitating server 102 transmits a notification message to the issuer server 106 to notify that the transaction receipt details have been transmitted to the user. At step 246, the facilitating server 102 transmits a further notification message to the merchant device 108 informing the merchant that the product amount has been transferred.

FIG. 2d shows a flow chart illustrating a computer-implemented method 255 for sending a transaction receipt from an application program perspective according to an example embodiment. At step 248, an application program receives a registration request from a user. The application program may be one that is installed and executed on the payment device 104. At step 250, the application program registers the user and provides a user account. At step 252, the application program generates a unique user identifier identifying the user and a unique device identifier identifying the payment device 104. At step 254, the application program receives a transaction request from the user who is interested to purchase a merchant's product. At step 256, the application program transmits the transaction request to the facilitating server 102. At step 258, the application program receives encrypted transaction receipt details from the facilitating server 102 via a push notification channel. At step 260, the application program generates a decryption key based on the unique user identifier and the unique device identifier. At step 262, the application program decrypts the encrypted transaction receipt details using the decryption key. At step 264, the application program displays the decrypted transaction receipt details to the user.

Figure 2E:
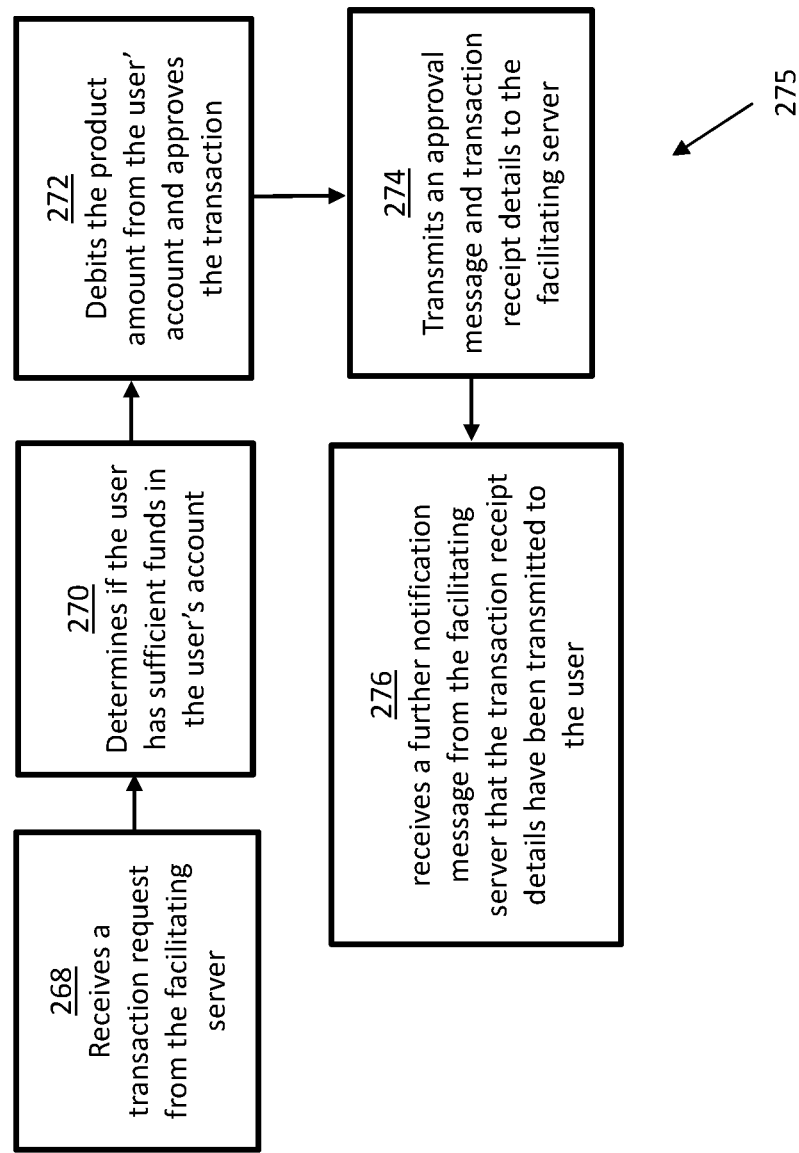
FIG. 2e shows a flow chart illustrating a computer-implemented method 275 for sending a transaction receipt from an issuer server perspective according to an example embodiment.

FIG. 2e shows a flow chart illustrating a computer-implemented method 275 for sending a transaction receipt from an issuer server perspective according to an example embodiment. At step 268, the issuer server 106 receives a transaction request from the facilitating server 102. At step 270, the issuer server 106 determines if the user has sufficient funds in the user's account. At step 272, the issuer server 106 debits the product amount from the user' account and approves the transaction. At step 274, the issuer server 106 transmits an approval message and transaction receipt details to the facilitating server 102. At step 276, the issuer server 106 receives a further notification message from the facilitating server 102 that the transaction receipt details have been transmitted to the user.

Figure 3A:
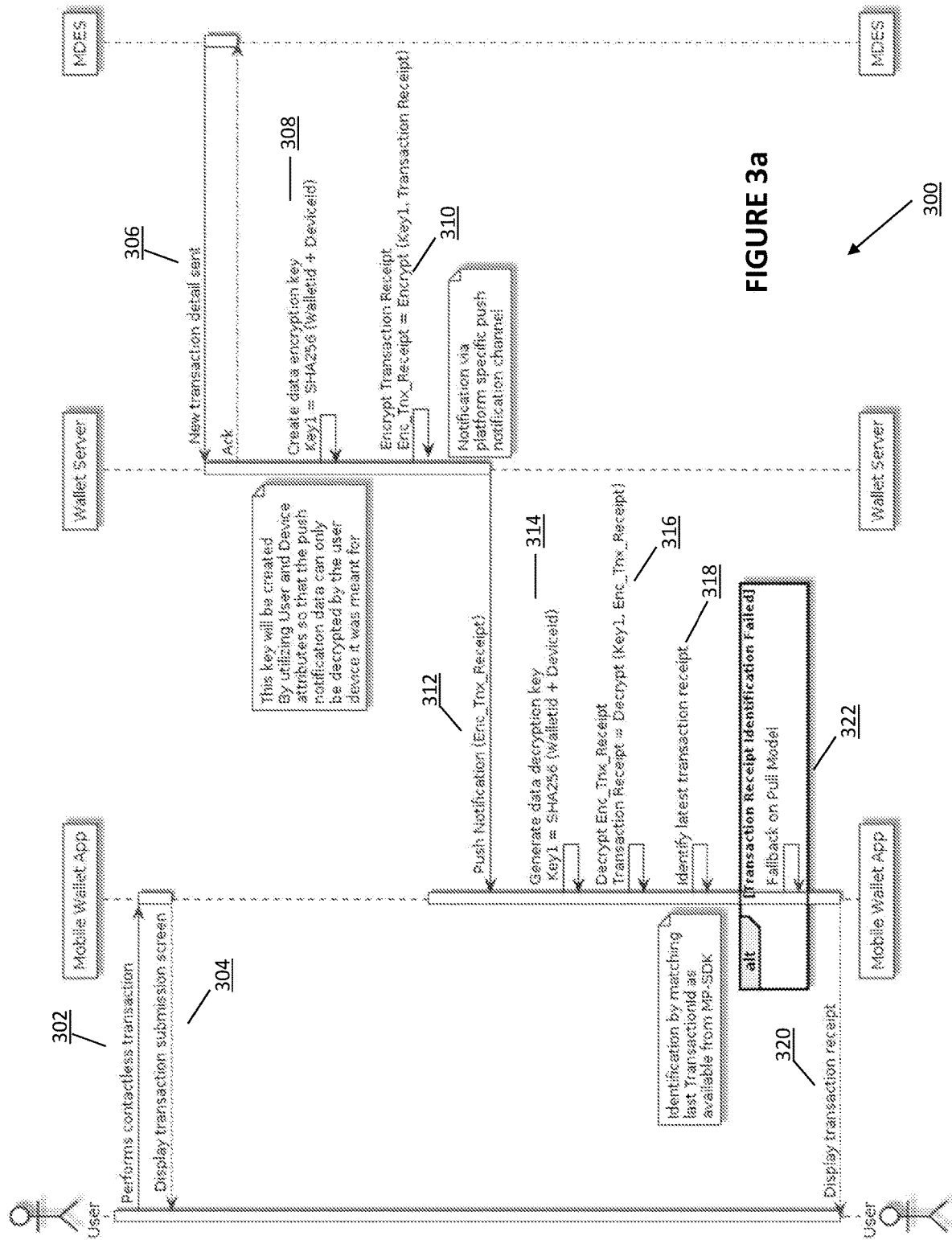
FIG. 3a shows a schematic diagram 300 illustrating the flow of information between various entities during a method for sending a transaction receipt in a contactless transaction, according to an example embodiment.

FIG. 3a shows a schematic diagram 300 illustrating the flow of information among various entities during a method for sending a transaction receipt in a contactless transaction, according to an example embodiment. At step 302, a user initiates a transaction request for a contactless transaction on an application program, for example a mobile wallet application that is installed on his device. His device may be in close proximity to a point-of-sale terminal of a merchant to initiate the contactless transaction. At step 304, the application program displays a transaction submission screen to the user. At step 306, a facilitating server 102 associated with the application program receives the contactless transaction details from a digital payment platform, e.g., "MasterCard Digital Enablement Service (MDES)". At step 308, the server creates a data encryption key based on a unique user identifier and a unique device identifier so that push notification data can only be decrypted by the user device. The user identifier may be generated by the application program based on a user's wallet identifier identifying the particular user's wallet. The unique device identifier may also be generated by the application program to identify the user's device when the user requests the contactless transaction on the application program. The application program may then store the identifiers as an algorithm key (e.g., key1 as shown in the Figure) in its database. At step 310, the server encrypts the transaction receipt using the encryption key.

At step 312, the server transmits the encrypted transaction receipt via push notification to the application program. Such a push notification can be achieved via a platform specific push notification channel. The platform specific push notification channel may include, but not limited to, one of Apple Push Notification Service (APNS), Google Cloud Messaging (GCM), Firebase Cloud Messaging (FCM), Sockets and Windows Push Notification Services (WNS).

For example, a push channel may be a channel of remote notification features that is used to propagate or push information to different devices that are connected to the same channel. One such example is APNs. Alternatively, devices that are on a same protocol may be configured to send/receive messages that are on the same connection. One such example is GCM. Additionally or alternatively, the devices may be on a cross-platform messaging solution that allows users to push messages like the FCM. A push channel may also be an internal endpoint for pushing data at a single node in a computer network. Concretely, it is a representation of this endpoint in networking software (protocol stack), such as an entry in a table (listing communication protocol, destination, status, etc.), and is a form of system resource like a socket.

It can be appreciated that other types of push notification channels may be used to transmit the encrypted transaction receipt to the application program. At step 314, the program generates a data decryption key based on the unique user identifier and the unique device identifier that were generated by the application program previously. At step 316, the program decrypts the encrypted transaction receipt using the data decryption key. At step 318, the program identifies the latest transaction receipt by matching the last transaction identification corresponding to the date and time stamp of the transactions from the facilitating server 102. At step 320, the application program displays the decrypted transaction receipt to the user. In the event that the program is unable to identify the latest transaction receipt, the program may rely on the pull model to display the transaction receipt at step 322.

Figure 3B:
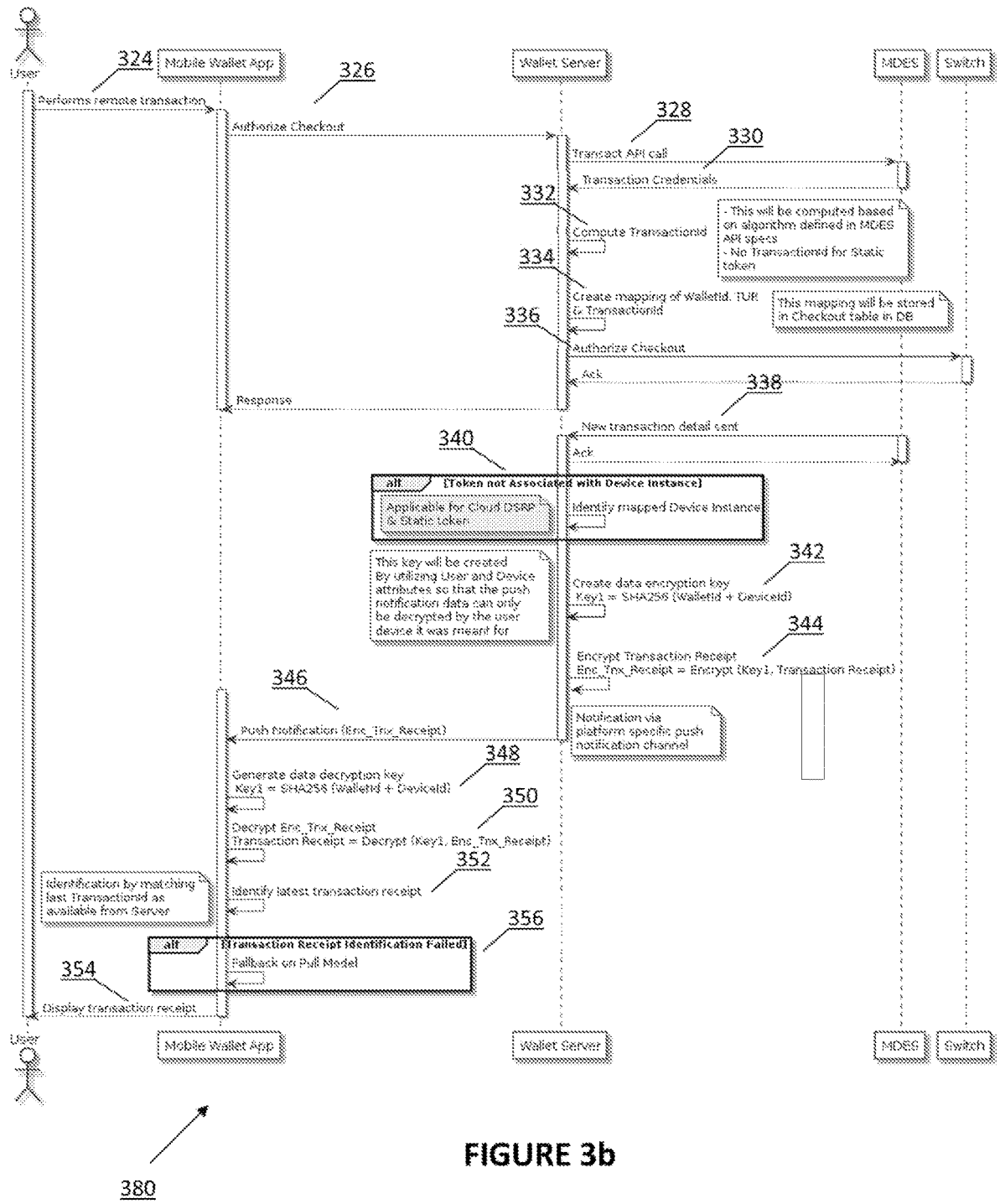
FIG. 3b shows a schematic diagram 380 illustrating the flow of information between various entities during a method for sending a transaction receipt in a remote transaction, according to an example embodiment.

FIG. 3b shows a schematic diagram 380 illustrating the flow of information between various entities during a method for sending a transaction receipt in a remote transaction, according to an example embodiment. At step 324, a user requests a remote transaction on an application program, for example a mobile wallet application that is installed on his device. At step 326, the program authorizes a checkout of a product the user purchases and transfer of funds to a server, e.g., a digital wallet server, associated with the application program. At step 328, the server transacts an application program interface call to a digital payment platform, e.g., "MasterCard Digital Enablement Service (MDES)". At step 330, the digital payment platform transmits transaction credentials to the server.

At step 332, the server computes a transaction identity (or transaction identifier) based on an algorithm defined in the application program. At step 334, the server creates a mapping of a wallet identity and a transaction identity. The server stores this mapping in a checkout table in its database. At step 336, the server transmits the checkout authorization to an issuer associated with an account of the user. At step 338, the digital payment platform transmits transaction details to the server. At step 340, the server may identify a mapped device based on whether a cloud-based digital secure remote payment and a static token is available. A user identifier may be generated by the application program based on a user's wallet identifier identifying the particular user's wallet. The unique device identifier may also be generated by the application program to identify the user's device when the user requests the remote transaction on the application program. The application program may then store the identifiers as an algorithm key (e.g., key1 as shown in the Figure) in its database. At step 342, the server creates a data encryption key based on the generated user and device identifiers so that push notification data can only be decrypted by the user device.

At step 344, the server encrypts the transaction receipt using the encryption key. At step 346, the server transmits the encrypted transaction receipt via push notification to the application program. Such a push notification can be achieved via a platform specific push notification channel. The platform specific push notification channel may include, but not limited to, one of Apple Push Notification Service (APNS), Google Cloud Messaging (GCM), Firebase Cloud Messaging (FCM), Sockets and Windows Push Notification Services (WNS). It can be appreciated that other types of push notification channels may be used to transmit the encrypted transaction receipt to the application program. At step 348, the program generates a data decryption key based on the user identifier and the device identifier generated by the application program previously. At step 350, the program decrypts the encrypted transaction receipt using the data decryption key. At step 352, the program identifies the latest transaction receipt by matching the last transaction identification from the server. At step 354, the application program displays the decrypted transaction receipt to the user. In the event that the program is unable to identify the latest transaction receipt, the program may rely on the pull model to display the transaction receipt at step 356.

Figure 5:
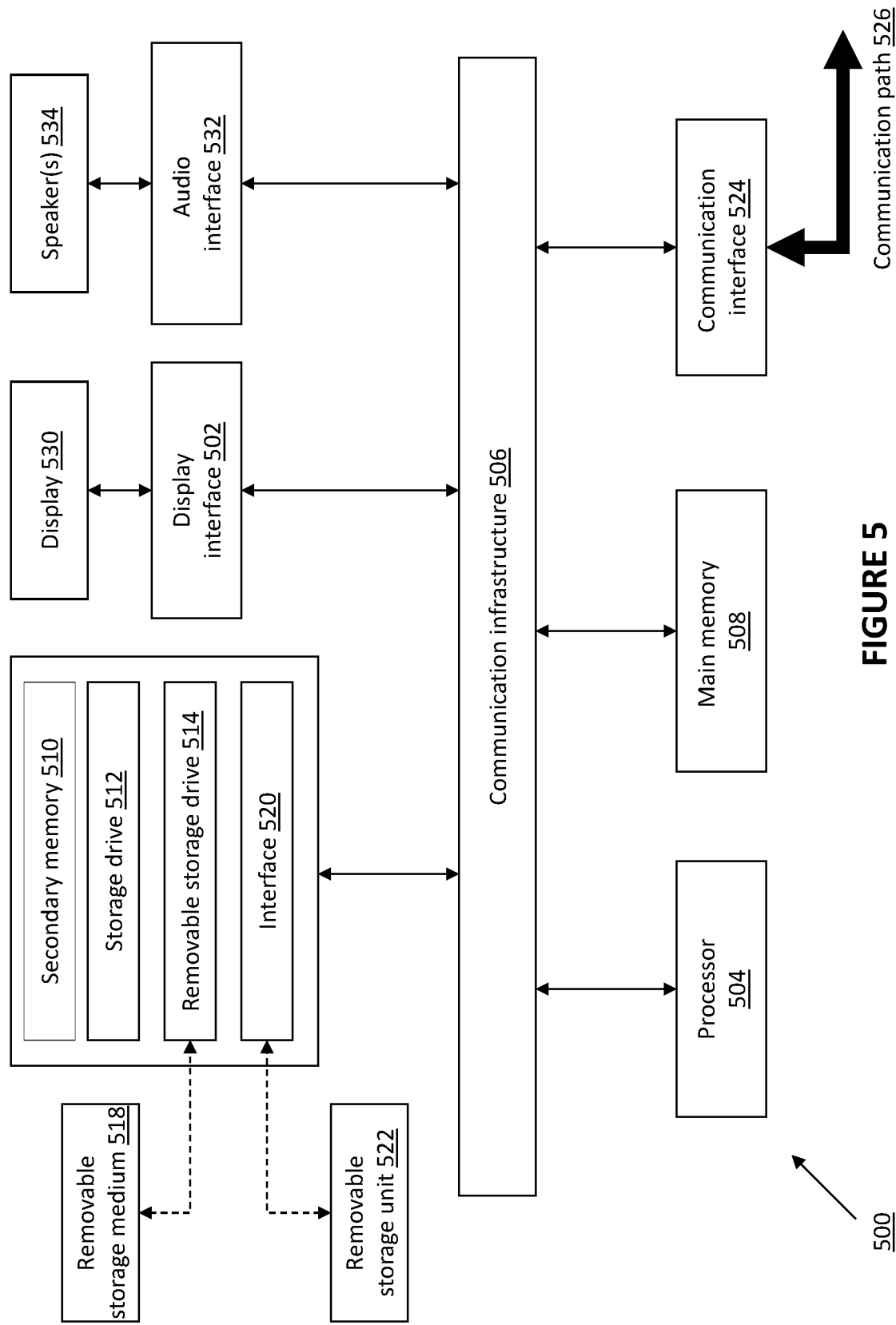
FIG. 5 shows a schematic diagram 500 of a computer system suitable for use in executing the method depicted in FIGS. 2a and 2b.

FIG. 5 depicts an exemplary computer/computing device 500, hereinafter interchangeably referred to as a computer system 500, where one or more such computing devices 500 may be used to facilitate execution of the above-described method. In addition, one or more components of the computer system 500 may be used to realize the computer 502. The following description of the computing device 500 is provided by way of example only and is not intended to be limiting.

As shown in FIG. 5, the example computing device 500 includes a processor 504 for executing software routines. Although a single processor is shown for the sake of clarity, the computing device 500 may also include a multi-processor system. The processor 504 is connected to a communication infrastructure 506 for communication with other components of the computing device 500. The communication infrastructure 506 may include, for example, a communications bus, cross-bar, or network.

The computing device 500 further includes a main memory 508, such as a random access memory (RAM), and a secondary memory 510. The secondary memory 510 may include, for example, a storage drive 512, which may be a hard disk drive, a solid state drive or a hybrid drive and/or a removable storage drive 514, which may include a magnetic tape drive, an optical disk drive, a solid state storage drive (such as a USB flash drive, a flash memory device, a solid state drive or a memory card), or the like. The removable storage drive 514 reads from and/or writes to a removable storage medium 518 in a well-known manner. The removable storage medium 518 may include magnetic tape, optical disk, non-volatile memory storage medium, or the like, which is read by and written to by removable storage drive 514. As will be appreciated by persons skilled in the relevant art(s), the removable storage medium 518 includes a computer readable storage medium having stored therein computer executable program code instructions and/or data.

In an alternative implementation, the secondary memory 510 may additionally or alternatively include other similar means for allowing computer programs or other instructions to be loaded into the computing device 500. Such means can include, for example, a removable storage unit 522 and an interface 520. Examples of a removable storage unit 522 and interface 520 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 522 and interfaces 520 which allow software and data to be transferred from the removable storage unit 522 to the computer system 500.

The computing device 500 also includes at least one communication interface 524. The communication interface 524 allows software and data to be transferred between computing device 500 and external devices via a communication path 526. In various embodiments of the disclosures, the communication interface 524 permits data to be transferred between the computing device 500 and a data communication network, such as a public data or private data communication network. The communication interface 524 may be used to exchange data between different computing devices 500 which such computing devices 500 form part an interconnected computer network. Examples of a communication interface 524 can include a modem, a network interface (such as an Ethernet card), a communication port (such as a serial, parallel, printer, GPIB, IEEE 1394, RJ25, USB), an antenna with associated circuitry and the like. The communication interface 524 may be wired or may be wireless. Software and data transferred via the communication interface 524 are in the form of signals which can be electronic, electromagnetic, optical or other signals capable of being received by communication interface 524. These signals are provided to the communication interface via the communication path 526.

As shown in FIG. 5, the computing device 500 further includes a display interface 502 which performs operations for rendering images to an associated display 530 and an audio interface 532 for performing operations for playing audio content via associated speaker(s) 534.

As used herein, the term "computer program product" may refer, in part, to removable storage medium 518, removable storage unit 522, a hard disk installed in storage drive 512, or a carrier wave carrying software over communication path 526 (wireless link or cable) to communication interface 524. Computer readable storage media refers to any non-transitory, non-volatile tangible storage medium that provides recorded instructions and/or data to the computing device 500 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a SD card and the like, whether or not such devices are internal or external of the computing device 500. Examples of transitory or non-tangible computer readable transmission media that may also participate in the provision of software, application programs, instructions and/or data to the computing device 500 include radio or infra-red transmission channels as well as a network connection to another computer or networked device, and the Internet or Intranets including e-mail transmissions and information recorded on Websites and the like.

The computer programs (also called computer program code) are stored in main memory 508 and/or secondary memory 510. Computer programs can also be received via the communication interface 524. Such computer programs, when executed, enable the computing device 500 to perform one or more features of embodiments discussed herein. In various embodiments, the computer programs, when executed, enable the processor 504 to perform features of the above-described embodiments. Accordingly, such computer programs represent controllers of the computer system 500.

Software may be stored in a computer program product and loaded into the computing device 500 using the removable storage drive 514, the storage drive 512, or the interface 520. Alternatively, the computer program product may be downloaded to the computer system 500 over the communications path 526. The software, when executed by the processor 504, causes the computing device 500 to perform functions of embodiments described herein.

It is to be understood that the embodiment of FIG. 5 is presented merely by way of example. Therefore, in some embodiments one or more features of the computing device 500 may be omitted. Also, in some embodiments, one or more features of the computing device 500 may be combined together. Additionally, in some embodiments, one or more features of the computing device 500 may be split into one or more component parts.

Figure 6:
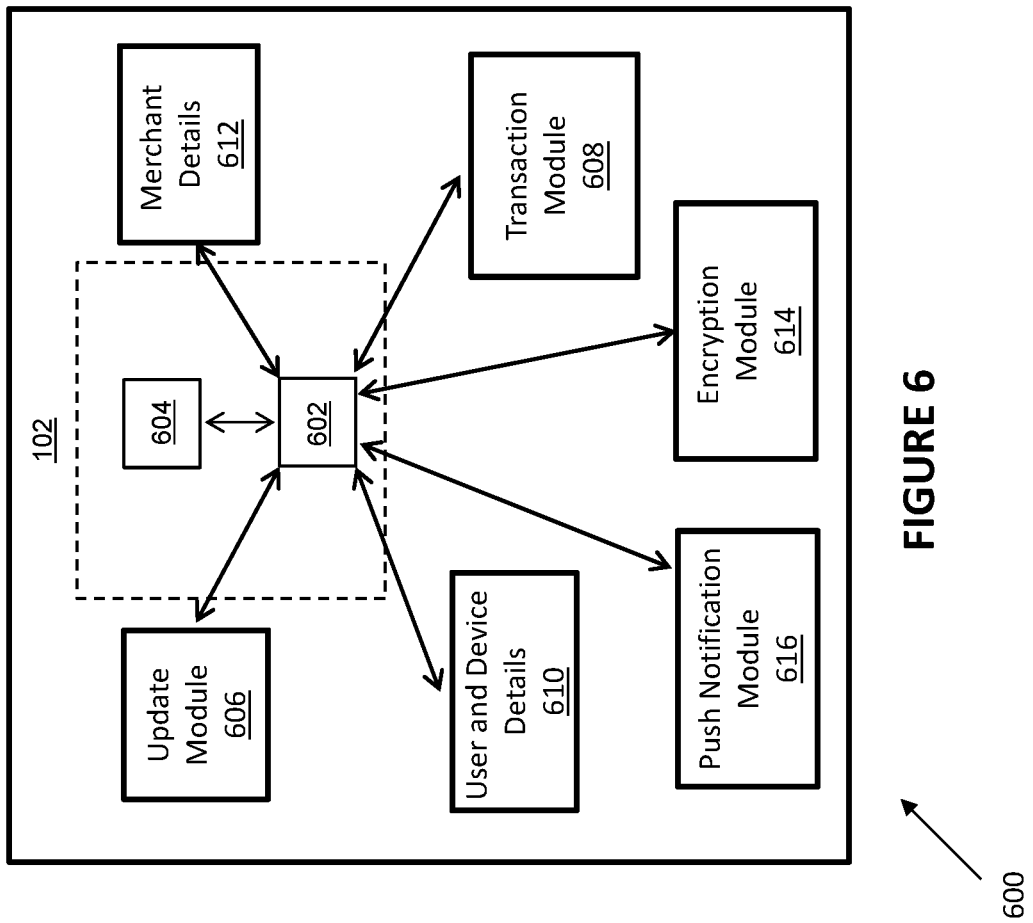
FIG. 6 shows an exemplary computing device 600 to realize a server for the facilitating server 102 shown in FIG. 1.

In an implementation, the facilitating server 102 may be generally described as a physical device comprising at least one processor 602 and at least one memory 604 including computer program code. The at least one memory 604 and the computer program code are configured to, with the at least one processor 602, cause the physical device to perform the operations described in FIGS. 2a to 2b. An example of the facilitating server 102 is shown in FIG. 6. The facilitating server 102 shown in FIG. 6 may also include an update module 606, a transaction module 608, a user and device detail module 610, a merchant details module 612, an encryption module 614 and a push notification module 616. The memory 604 stores computer program code that the processor 602 compiles to have each of the update module 606, the transaction module 608, the user and device detail module 610, the merchant details module 612, the encryption module 614 and the push notification module 616 perform their respective functions. With reference to FIG. 1, the update module 606 is configured to update the database 110 on the status of the transaction, transaction request details and details of the user and the merchant. The transaction module 608 is configured to receive transaction request from the payment device 104, transmit the transaction request to the issuer server 106, generating a unique transaction identifier to identify the transaction and to receive transaction receipt details from the issuer server 106. The user and device details module 610 is configured to receive details of the user and his corresponding device from the application program while the merchant details module 612 is configured to receive details of the merchant. The encryption module 614 is configured to generate an encryption key and encrypt the transaction receipt details while the push notification module 616 is configured to transmit the encrypted transaction receipt to the payment device 104 via a push notification channel.

For example, the method of FIG. 2 may be implemented as software and stored in a non-transitory fashion in the secondary memory 510 or the removable storage units 518, 522 of the computer device 500.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "analysing", "determining", "replacing", "generating", "initializing", "outputting", "receiving", "retrieving", "identifying", "predicting" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses a server for performing the operations of the methods. Such server may be specially constructed for the required purposes, or may comprise a computer or other device selectively activated or reconfigured by a computer program stored in the computer. The algorithms and displays presented herein are not inherently related to any particular computer or other server. Various machines may be used with programs in accordance with the teachings herein. Alternatively, the construction of a more specialized server to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in a server that implements the steps of the method(s) herein.

In embodiments of the present disclosure, use of the term 'server' may mean a single computing device or at least a computer network of interconnected computing devices which operate together to perform a particular function. In other words, the server may be contained within a single hardware unit or be distributed among several or many different hardware units.

It will be appreciated by a person skilled in the art that numerous variations and/or modifications may be made to the present disclosure as shown in the specific embodiments without departing from the spirit or scope of the disclosure as broadly described. For example, the above description mainly discusses the use of a Bluetooth connection, but it will be appreciated that another type of secure wireless connection, such as Wi-Fi, can be used in alternate embodiments to implement the method. Some modifications, e.g., adding an access point, changing the log-in routine, etc. may be considered and incorporated. The present embodiments are, therefore, to be considered in all respects to be illustrative and not restrictive.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A wallet server for sending transaction receipt details for a user-initiated transaction request, the wallet server comprising:
   at least one processor; and
   at least one memory including computer program code configured to cause the at least one processor to:
   receive, from an issuer server, an approval message approving the user-initiated transaction request and transaction receipt details, the approval message including a unique device identifier identifying a payment device used to initiate the user-initiated transaction request;
   retrieve, from a database, a description corresponding to a product indicated in the transaction receipt details;

generate an encryption key based on the received unique device identifier identifying the payment device;

encrypt the transaction receipt details and description corresponding to the product indicated in the transaction receipt details, based on the generated encryption key, to provide encrypted transaction receipt details;

generate a unique transaction identifier identifying the user-initiated transaction; and push, to the payment device identified by the unique device identifier, the encrypted transaction receipt details and the unique transaction identifier, via a push notification channels to a wallet application included in the payment device.

2. The server according to claim 1, wherein the computer program code is further configured to cause the at least one processor to: associate the unique transaction identifier with the encrypted transaction receipt details.

3. The server according to claim 1, wherein the computer program code is further configured to cause the at least one processor to generate a unique user identifier identifying a user who initiates the transaction request; and wherein the computer program code is configured to cause the at least one processor to generate the encryption key further based on the unique user identifier identifying the user.

4. The server according to claim 1, wherein the computer program code is further configured to cause the at least one processor to:

aggregate a plurality of encryption keys into a table of encryption keys; and store the table of encryption keys into a database.

5. The server according to claim 1, wherein the computer program code is further configured to cause the at least one processor to:

generate a decryption key to decrypt the transaction receipt details; and transmit the decrypted transaction receipt details to the payment device identified by the unique device identifier included in the transaction receipt details.

6. The server according to claim 5, wherein the computer program code is further configured to cause the at least one processor to:

generate a notification message notifying the issuer server that the transaction receipt details have been decrypted.

7. The server according to claim 1, wherein the computer program code is further configured to cause the at least one processor to:

prior to receiving, from the issuer server, the approval message: receive, from the payment device, via the wallet application, transaction request details corresponding to the user-initiated transaction request, the transaction request details indicating a merchant from which the product is to be purchased;

retrieve, from the database, a merchant identifier corresponding to the merchant indicated in the transaction request details in response to the receipt of the transaction request details; and provide the merchant identifier to the transaction receipt details.

8. The server according to claim 1, wherein the transaction receipt details comprise at least one of a date and time of the user-initiated transaction request, a merchant identifier, a price corresponding to the product, the description corresponding to the product, account data, payment device data and merchant data.

9. A computer-implemented method for sending transaction receipt details for a user-initiated transaction request, the method comprising:

receiving, from an issuer server, an approval message approving the user-initiated transaction request and transaction receipt details, the approval message including a unique device identifier identifying a payment device used to initiate the user-initiated transaction request;

generating an encryption key based on the received unique device identifier identifying the payment device;

encrypting the transaction receipt details, based on the encryption key;

providing, to the payment device identified by the received unique device identifier, the encrypted transaction receipt details;

generating a decryption key to decrypt the transaction receipt details;

displaying the decrypted transaction receipt details to the user; and after decrypting the transaction receipt details, generating a notification message notifying the issuer server that the transaction receipt details have been decrypted.

10. The method according to claim 9, further comprising:

generating a unique user identifier identifying a user who initiates the transaction request; and generating the encryption key to encrypt the transaction receipt details based on the unique device identifier identifying the payment device and the unique user identifier identifying the user.

11. The method according to claim 9, further comprising:

prior to receiving, from the issuer server, an approval message: receiving, from the payment device, transaction request details corresponding to the user-initiated transaction request, the transaction request details indicating a product to be purchased;

retrieving, from a database, a description corresponding to the product indicated in the transaction request details in response to the receipt of the transaction request details; and providing the description to the transaction receipt details.

12. The method according to claim 11, further comprising:

prior to receiving, from the issuer server, an approval message: receiving, from the payment device, transaction request details corresponding to the user-initiated transaction request, the transaction request details indicating a merchant from which the product is purchased;

retrieving, from a database, a merchant identifier corresponding to the merchant indicated in the transaction request details in response to the receipt of the transaction request details; and providing the merchant identifier to the transaction receipt details.

* * * * *